US012652692B2

(12) United States Patent
Peng et al.

(10) Patent No.: US 12,652,692 B2
(45) Date of Patent: Jun. 9, 2026

(54) RESOURCE SELECTION METHOD, TERMINAL, AND NETWORK-SIDE DEVICE

(71) Applicant: VIVO MOBILE COMMUNICATION CO., LTD., Guangdong (CN)

(72) Inventors: Shuyan Peng, Guangdong (CN); Zichao Ji, Guangdong (CN); Shixiao Liu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 611 days.

(21) Appl. No.: 17/944,780

(22) Filed: Sep. 14, 2022

(65) Prior Publication Data

US 2023/0007669 A1 Jan. 5, 2023

Related U.S. Application Data

(63) Continuation of application No. PCT/CN2021/083912, filed on Mar. 30, 2021.

(30) Foreign Application Priority Data

Apr. 1, 2020 (CN) .......................... 202010252514.1

(51) Int. Cl.
*H04W 72/542* (2023.01)
*H04W 72/02* (2009.01)

(52) U.S. Cl.
CPC ......... *H04W 72/542* (2023.01); *H04W 72/02* (2013.01)

(58) Field of Classification Search
CPC ............................ H04W 72/542; H04W 72/02
See application file for complete search history.

(56) References Cited

U.S. PATENT DOCUMENTS

| | | | |
|---|---|---|---|
| 2019/0075548 A1 | 3/2019 | Lee et al. | |
| 2019/0132818 A1 | 5/2019 | Yasukawa et al. | |
| 2019/0132832 A1 | 5/2019 | Uchiyama et al. | |
| 2019/0306835 A1* | 10/2019 | Hoang | H04W 72/53 |
| 2019/0313405 A1* | 10/2019 | Li | H04W 72/542 |
| 2020/0037358 A1 | 1/2020 | Chae et al. | |
| 2020/0229171 A1* | 7/2020 | Khoryaev | H04W 4/40 |

(Continued)

FOREIGN PATENT DOCUMENTS

| | | |
|---|---|---|
| CA | 3082263 A1 | 5/2019 |
| CN | 107734649 A | 2/2018 |

(Continued)

OTHER PUBLICATIONS

First Office Action for Indian Application No. 202227061692, dated Jan. 17, 2023, 8 pages.

(Continued)

*Primary Examiner* — Won Tae C Kim

(74) *Attorney, Agent, or Firm* — BROOKS KUSHMAN P.C.

(57) ABSTRACT

A resource selection method, a terminal, and a network-side device, and relates to the field of communications technologies. The resource selection method is applied to a terminal and includes: obtaining configuration information of a sensing window in a partial sensing mechanism; performing monitoring in the sensing window indicated by the configuration information to obtain a monitoring result; and obtaining a selectable resource set based on the monitoring result.

20 Claims, 8 Drawing Sheets

(56)      References Cited

U.S. PATENT DOCUMENTS

| | | | |
|---|---|---|---|
| 2020/0314803 A1* | 10/2020 | Zhang | H04W 74/006 |
| 2020/0367113 A1 | 11/2020 | Tang | |
| 2021/0250136 A1* | 8/2021 | Ye | H04L 1/1812 |
| 2023/0141380 A1* | 5/2023 | Yu | H04W 72/40 |
| | | | 370/329 |
| 2023/0199728 A1* | 6/2023 | Yoshioka | H04W 76/14 |
| | | | 370/329 |

FOREIGN PATENT DOCUMENTS

| | | |
|---|---|---|
| CN | 108024230 A | 5/2018 |
| CN | 108024318 A | 5/2018 |
| CN | 108616839 A | 10/2018 |
| CN | 109247073 A | 1/2019 |
| EP | 3512246 A1 | 7/2019 |
| JP | 2017208796 A | 11/2017 |
| JP | 2019531653 A | 10/2019 |
| JP | 2021516885 A | 7/2021 |
| KR | 20190051057 A | 5/2019 |
| WO | 2017179286 A1 | 10/2017 |
| WO | 2018028475 A1 | 2/2018 |
| WO | 2018030825 A1 | 2/2018 |
| WO | 2018145067 A1 | 8/2018 |
| WO | 2019148489 A1 | 8/2019 |

OTHER PUBLICATIONS

International Search Report and Written Opinion for Application No. PCT/CN2021/083912, dated Jun. 22, 2021, 8 pages.

Huawei et al. "Discussion on the P-UE resource selection" 3GPP TSG RAN WGJ Meeting #86bis RI-1608649, dated Oct. 9, 2016, 5 pages.

Spreadtrum Communications. "Discussion on resource sensing and selection for pedestrian UEs", 3GPP TSG RAN WGJ Meeting #86bis RI-160891L, Dated Sep. 30, 2016, 3 pages.

Extended European Search Report for Application No. 21780636.3, dated Sep. 6, 2023, 9 Pages.

First Office Action for Japanese Application No. 2022-559819, dated Sep. 28, 2023, 3 Pages.

Apple " Remaining Details on Resource Allocation for Mode 2" 3GPP TSG RAN WG1 #100-e, e-Meeting, Feb. 2020, R1-2000852, 6 Pages.

First Office Action for Korean Application No. 10-2022-7038052, dated Feb. 10, 2025, 38 Pages.

Huawei, et, al. "WF on P-UE sensing timeline in partial sensing"3GPP TSG RAN WG1 Meeting #86b, Lisbon, Portugal, Oct. 2016, R1-1611016, 5 Pages.

Sequans Communications "Partial sensing for pedestrian UEs" 3GPP TSG RAN WG1 Meeting #87, Reno, USA, Nov. 2016, R1-1611266, 6 Pages.

CATT "Discussion on partial sensing by pedestrian UEs" 3GPP TSG RAN WG1 Meeting #88, Athens, Greece, Feb. 2017, R1-1702033, 2 Pages.

Huawei, et, al. "WF on P-UE sensing for shorter reservation period" 3GPP TSG RAN WG1 Meeting #88, Athens, Greece, Feb. 2017, R1-1703834, 4 Pages.

* cited by examiner

RESOURCE SELECTION METHOD, TERMINAL, AND NETWORK-SIDE DEVICE

CROSS-REFERENCE TO RELATED APPLICATIONS

This application is a continuation of PCT International Application No. PCT/CN2021/083912 filed on Mar. 30, 2021, which claims priority to Chinese Patent Application No. 202010252514.1 filed on Apr. 1, 2020, which are incorporated herein by reference in their entireties.

TECHNICAL FIELD

The present invention relates to the field of communications technologies, and in particular, to a resource selection method, a terminal, and a network-side device.

BACKGROUND

New radio (NR) vehicle to everything (V2X) needs to support communication between pedestrian user equipments (PUE) and vehicles. Compared with vehicle user equipments (VUE), PUEs require additional consideration of power saving. If PUEs use a same resource pool for transmission as VUEs, a PUE need to perform resource monitoring so as to avoid using transmission resources occupied by other PUEs and those occupied by VUEs.

In order to support PUE transmission and reception on part of sidelink resources, selected resources need to have relatively small interference in a system, to improve transmission efficiency (for example, signal quality and the number of transmissions) of terminals and resource efficiency of the system. To select appropriate resources, the PUE needs to monitor interference in the system. However, the existing monitoring method consumes much power, resulting in relatively low energy efficiency and short battery life of PUEs.

SUMMARY

According to a first aspect, an embodiment of the present invention provides a resource selection method, applied to a terminal and including:

obtaining configuration information of a sensing window in a partial sensing mechanism;

performing monitoring in the sensing window indicated by the configuration information to obtain a monitoring result; and obtaining a selectable resource set based on the monitoring result.

According to a second aspect, an embodiment of the present invention further provides a resource selection method, applied to a network-side device and including:

sending configuration information of a sensing window in a partial sensing mechanism to a terminal.

According to a third aspect, an embodiment of the present invention further provides a terminal, including:

a first obtaining module, configured to obtain configuration information of a sensing window in a partial sensing mechanism;

a second obtaining module, configured to perform monitoring in the sensing window indicated by the configuration information to obtain a monitoring result; and a third obtaining module, configured to obtain a selectable resource set based on the monitoring result.

According to a fourth aspect, an embodiment of the present invention further provides a terminal, including a memory, a processor, and a computer program stored in the memory and capable of running on the processor. When the computer program is executed by the processor, the steps of the resource selection method are implemented.

According to a fifth aspect, an embodiment of the present invention further provides a network-side device, including:

a first sending module, configured to send configuration information of a sensing window in a partial sensing mechanism to a terminal.

According to a sixth aspect, an embodiment of the present invention further provides a network-side device, including a memory, a processor, and a computer program stored in the memory and capable of running on the processor. When the computer program is executed by the processor, the steps of the resource selection method are implemented.

According to a seventh aspect, an embodiment of the present invention further provides a computer-readable storage medium, where a computer program is stored in the computer-readable storage medium, and when the computer program is executed by a processor, the steps of the resource selection method are implemented.

DETAILED DESCRIPTION

Figure 1:
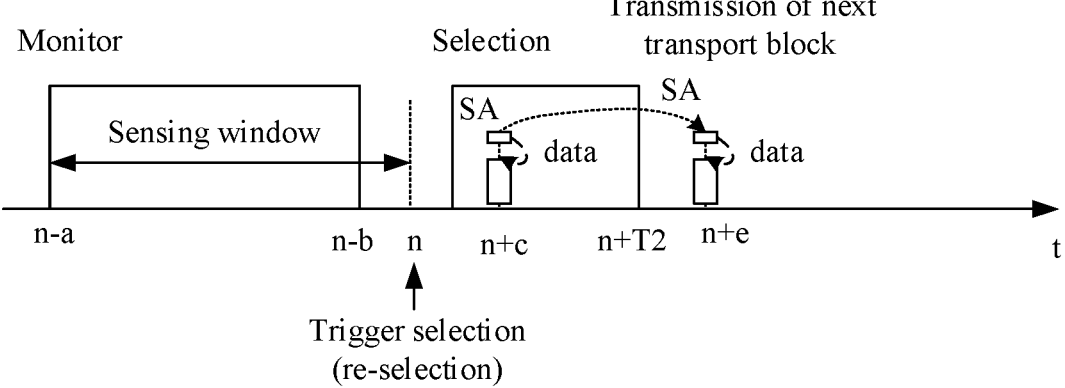
FIG. 1 is a schematic diagram of LTE sidelink resource allocation mode 4.

To make the objectives, technical solutions, and advantages of the present invention clearer, the following further describes the present invention in detail with reference to the accompanying drawings and specific embodiments.

For description of the embodiments of the present invention, some concepts used in the following description are first described.

1. Vehicle to Everything (V2X)

Long term evolution (LTE) has supported Sidelink (sidelink) transmission since release 12, allowing user equipments (UE, also called terminal) to directly transmit data at a physical layer without intervention of a network device. LTE sidelink communication is performed based on broadcast, although supporting basic safety communication in V2X, not suitable for other more advanced V2X services. The fifth generation (5G) new radio (NR) system supports more advanced sidelink transmission designs, such as unicast and multicast or groupcast, and therefore can support more comprehensive service types.

The design of LTE sidelink is suitable for specific public safety affairs (such as emergency communication in disaster areas such as fire or earthquake) or vehicle to everything (V2X) communication. Vehicle to everything communication includes various services, such as basic safety communication, advanced (autonomous) driving, formation, sensor expansion, and so on. LTE sidelink supports only broadcast communication, mainly used for basic safety communication, and NR sidelink supports other advanced V2X services with high quality of service (QoS) requirements in terms of delay, reliability, and the like.

NR R16 V2X supports vehicle to vehicle (V2V) communication.

2. Resource Allocation

The design of LTE sidelink supports two resource allocation modes, namely, scheduled resource allocation mode and autonomous resource selectionmode. In the former mode, a network-side device controls and allocates resources for each UE, and in the latter mode, resources are autonomously selected by UEs. LTE sidelink resource allocation mode 1 is a device-to-device (D2D) scheduling resource allocation mode, LTE sidelink resource allocation mode 2 is a D2D autonomous resource allocation mode; LTE sidelink resource allocation mode 3 is a V2X scheduling resource allocation mode, and LTE sidelink resource allocation mode 4 is a V2X autonomous resource allocation mode.

A basic working principle of LTE sidelink mode 4 is shown in FIG. 1.

Figure 2:
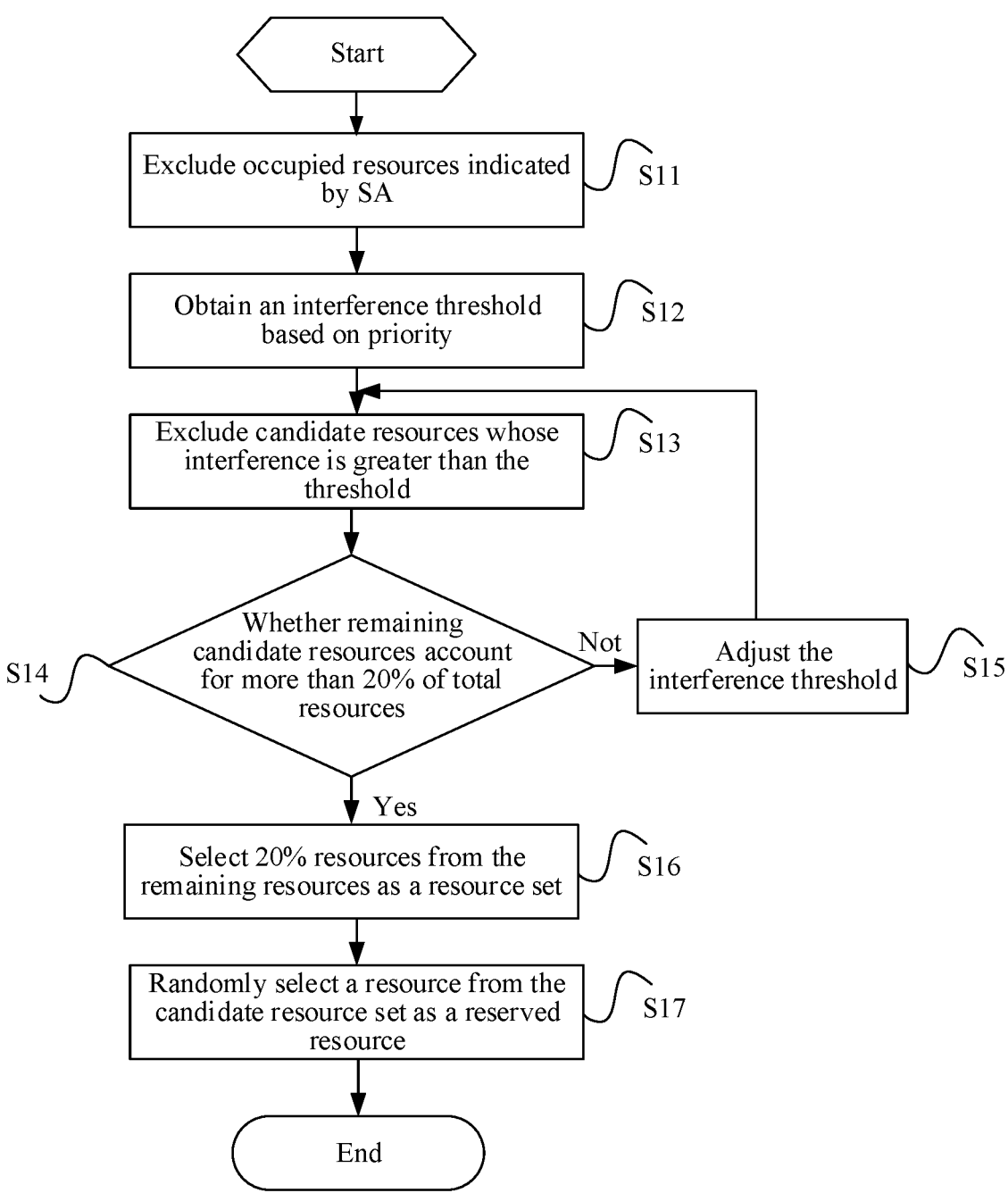
FIG. 2 is a schematic flowchart of LTE sidelink resource allocation mode 4.

Measurement is performed in a sensing window, and scheduling assignment (SA) demodulation and interference measurement are performed within each monitoring transmission time interval (TTI). The UE performs resource selection based on the steps shown in FIG. 2.

Step S11: Exclude occupied resources indicated by SA.

This step is mainly to demodulate a received SA by the terminal to obtain resources reserved for other UEs, so as to exclude the resources reserved for other UEs.

Step S12: Obtain an interference threshold based on priority.

Step S13: Exclude candidate resources whose interference is greater than the threshold.

This step is mainly to perform energy monitoring within the sensing window by measuring reference signal strength indication (RSSI), and then based on a measurement result, exclude candidate resources whose interference is greater than the threshold.

Step S14: Determine whether remaining candidate resources account for more than 20% of total resources; if not, perform step S15; otherwise, perform step S16.

Step S15: Adjust the interference threshold, and proceed to step S13.

Step S16: Select 20% resources from the remaining resources as a resource set.

Step S17: Randomly select a resource from the candidate resource set as a reserved resource.

This step is mainly to randomly select a subframe from the 20% resources with least interference within a selection window, so as to implement periodic resource reservation.

NR V2X defines two resource allocation modes: in mode 1, resources are scheduled by a base station; in mode 2, UE determines by itself which resource is to be used for transmission. In this case, resource information may be obtained from a broadcast message of the base station or preconfigured information. If the UE works within coverage of the base station and has an RRC connection to the base station, the UE can work in mode 1 and/or mode 2; if the UE works within coverage of the base station but has no RRC connection to the base station, the UE can work only in mode 2; and if the UE is outside coverage of the base station, the UE can work only in mode 2 and performs V2X transmission based on preconfigured information.

In mode 2, a specific working manner is as follows: (1) After resource selection is triggered, TX UE first determines a resource selection window, with a lower boundary of the resource selection window being in a time of T1 after triggering of resource selection and an upper boundary for resource selection being in a time of T2 after triggering, where T2 is a value selected by the UE from a packet delay budget (PDB) of its TB transmission, and T2 is not earlier than T1. (2) Before resource selection, the UE needs to determine a candidate resource set for resource selection by comparing a reference signal received powers (RSRP) measured on resources in a resource selection window with a corresponding RSRP threshold and then adding the resources into the candidate resource set if the RSRP is lower than the RSRP threshold. (3) After being determined, the candidate resource set is reported to a medium access control (MAC) layer, and the MAC layer randomly selects a resource from the candidate resource set as the resource of the UE. In addition, during a current transmission, the UE may reserve transmission resources for a next transmission.

NR V2X supports chained resource reservation, that is, one piece of sidelink control information (SCI) may be used for reserving and indicating a frequency domain resource of a current slot and also for reserving a maximum of two additional resources; and two more reserved resources can be indicated during transmission on a next resource. Within the selection window, resources can be continuously reserved in a dynamic reservation manner.

3. Partial Sensing

Part sensing in LTE V2X is mainly designed for power saving to support P2V communication. PUEs support two modes of resource selection. One is random resource selection; the other is partial sensing mode, where monitoring is first performed on part of resources, a resource is selected based on a partial sensing result, to implement semi-static resource reservation. Which mode to be selected by the PUE is configured via radio resource control (RRC), and when the RRC configures two modes of resource selection being supported, the PUE determines a resource selection manner to be used.

Figure 3:
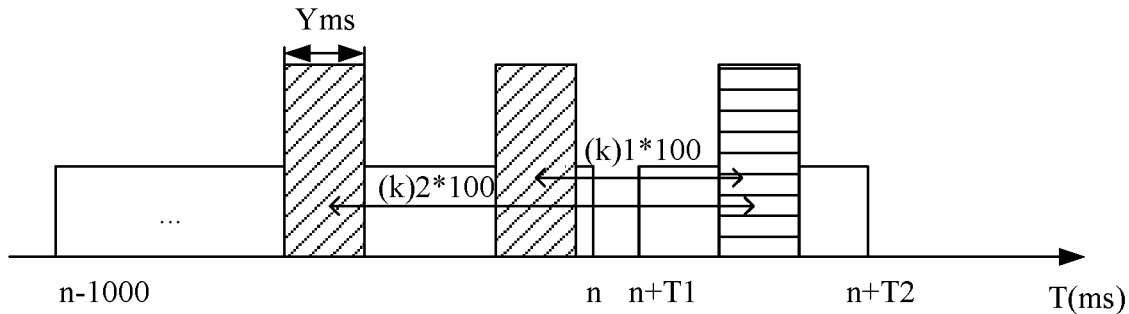
FIG. 3 is a schematic diagram of LTE partial sensing.

Specifically, a manner of partial sensing and resource selection by the terminal is shown in FIG. 3.

A PUE sensing window is a resource subset within a range of [n−1000, n] (a blank box between n−1000 and n represents a sensing window range). Each sub-window (which is a slashed rectangle in the figure) is Yms in length, which is a length of the PUE sensing window. k is a parameter configured via RRC, and a value range of k may be {1,2,3, . . . , 10}. A rectangle filled with horizontal lines within [n+T 1, n+T2] of the selection window indicates a PUE selection window configured by a higher layer. In the PUE sensing window in the slashed rectangle, the PUE monitors SCI sent by other terminals; and based on detected SCI and a reservation period, infers a resource reservation status of other terminals in the PUE selection window indicated by the rectangle filled with horizontal lines. Then, based on such information, the PUE may exclude resources not satisfying a condition from the selection window. At least 20% of the remaining resources (20% of the window length Y) is used as the candidate resource set, and is reported to the medium access control (MAC) layer. The MAC layer randomly selects a resource from the candidate resource set as the resource of the PUE. The PUE performs periodic reservation for the selected resource, and a reservation period is indicated in SCI.

In view of relatively high power consumption and relatively short battery life of NR PUEs during interference monitoring in the system, the present invention provides a resource selection method, a terminal, and a network-side device.

Figure 4:
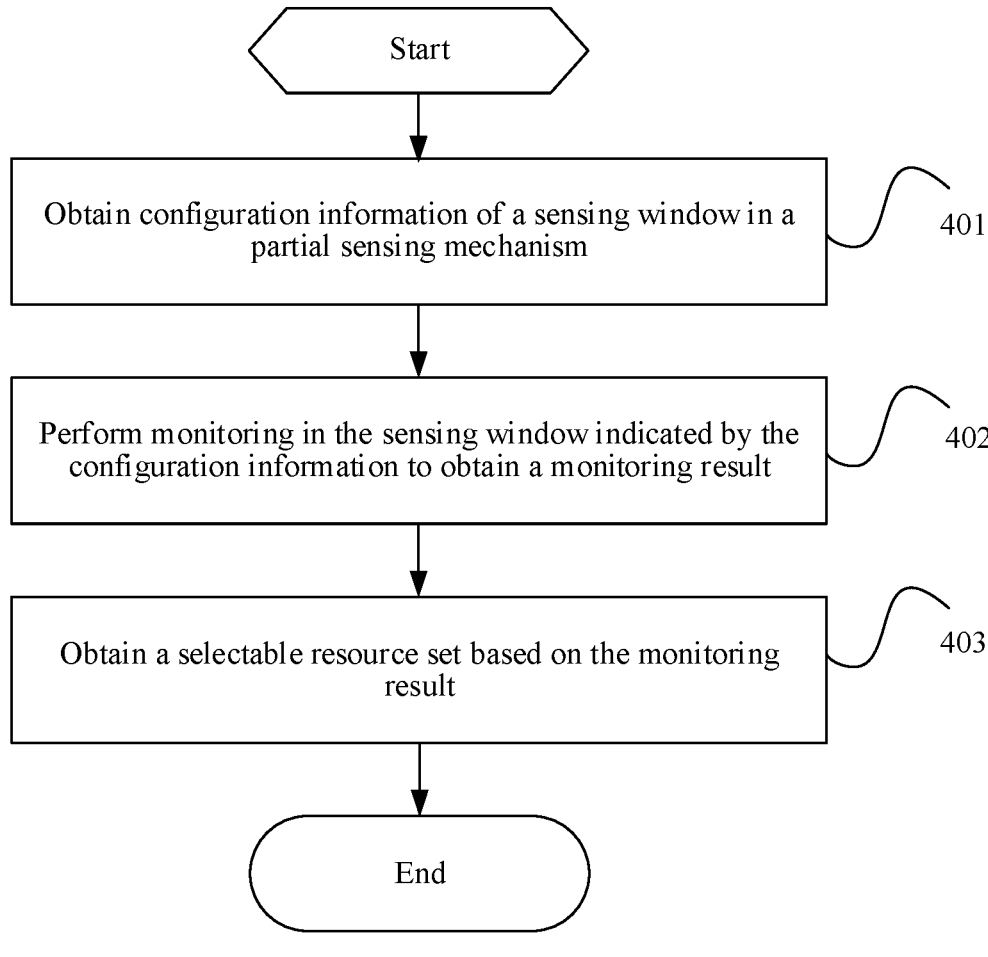
FIG. 4 is a first schematic flowchart of a resource selection method according to an embodiment of the present invention.

As shown in FIG. 4, an embodiment of the present invention provides a resource selection method, applied to a terminal and including the following steps.

Step 401: Obtain configuration information of a sensing window in a partial sensing mechanism.

Step 402: Perform monitoring in the sensing window indicated by the configuration information to obtain a monitoring result.

It should be noted that the sensing window indicated by the configuration information is part of a selectable sensing window, and the terminal needs to perform monitoring only in the configured part of the sensing window.

Step 403: Obtain a selectable resource set based on the monitoring result.

It should be noted that in this step, the terminal obtains the selectable resource set in the resource selection window based on the monitoring result in the configured sensing window.

It should be noted that the terminal described in this embodiment of the present invention is PUE.

It should be noted that the terminal may perform at least one of the following operations on resources in the sensing window (which is a resource sensing window) in this embodiment of the present invention:

monitoring sidelink control channel (PSCCH)/SCI;
demodulating PSCCH/SCI;
monitoring/demodulating PSSCH;
monitoring/demodulating sidelink feedback channel (PSFCH);
monitoring/demodulating sidelink feedback control information (SFCI);
monitoring/demodulating hybrid automatic repeat request acknowledgement (HARQ-ACK);
measuring reference signal received power (RSRP);
measuring received signal strength indication (RSSI), for example, PSCCH/PSSCH DMRS RSRP/RSSI;
measuring channel occupancy ratio (CR); and
measuring channel busy ratio (CBR).

It should be noted that the following mainly describes in detail this embodiment of the present invention by using a configuration of continuous sensing windows and a configuration of non-continuous sensing windows as examples.

1. Configuration of Continuous Sensing Windows

Specifically, the terminal may obtain configuration information of at least one sensing window from a protocol prescription, configuration, and/or preconfiguration.

It should be noted that the configuration or preconfiguration may be configuration by the network-side device, or may be configuration by the terminal. Specifically, the configuration by the network-side device may be radio resource control (RRC) configuration, medium access control control element (MAC CE) configuration, downlink control information (DCI) indication, or the like; and the configuration by the terminal may be PC5-RRC configuration, sidelink control information (SCI) indication, or the like.

It should be noted that, in this case, the configuration information of the sensing window in this embodiment of the present invention includes at least one of the following:

A11: Length configuration parameter of the sensing window

Further, the length configuration parameter of the sensing window includes at least one of the following:

A111: Length of the sensing window

It should be noted that a specific value of the length of the sensing window is directly limited herein.

A112: Minimum value of the length of the sensing window

Specifically, in this case, the minimum value indicates that the length of the sensing window is determined by the terminal itself, and the minimum value of the length is set to prevent the terminal from selecting a sensing window with an excessively small length. Herein, a maximum value of the length of the sensing window is not set provided that the length of the sensing window determined by the terminal is greater than the minimum value.

A113: Length range of the sensing window

It should be noted that the length range herein refers to a maximum value and a minimum value that confine the length of the sensing window, and the length of the sensing window determined by the terminal needs to fall between the maximum value and the minimum value.

It should be further noted that the length configuration parameter is at least one of the following:

A1101: Protocol-predefined parameter

For example, the length configuration parameter depends on a time domain resource interval indicated by SCI, for example, 32 slots.

A1102: Parameter configured via RRC

It should be noted that, for RRC configuration, configuration via RRC dedicated signaling may be referred to as RRC configuration, and configuration via RRC broadcast signaling may be referred to as RRC preconfiguration. It should be noted that, for example, the RRC preconfiguration manner needs to be used for a terminal in an idle state, and the RRC preconfiguration or RRC configuration manner may be used for a terminal in a connected state.

A1103: Parameter indicated by MAC CE

A1104: Parameter indicated by DCI

A1105: Parameter indicated by SCI

It should be noted that the length configuration parameter may be a parameter configured per resource pool, per bandwidth part (BWP), and per carrier by using any one or more of A1102 to A1105 described above.

A1106: Parameter that is determined based on a start time and/or an end time of a resource selection window That is, in this case, the start time and/or end time of the resource selection window is configured, that is, the length of the sensing window depends on the start time and/or end time of the resource selection window, and the length of the sensing window is not additionally specified.

A1107: Length configuration parameter of the sensing window that is determined based on a length of the resource selection window That is, in this case, the length of the sensing window is directly limited. To be specific, the length configuration parameter of the sensing window is obtained directly based on the length of the resource selection window.

A12: Position configuration parameter of the sensing window

Specifically, it should be noted that the position configuration parameter of the sensing window includes at least one of a start time of the sensing window, an end time of the sensing window, and a position of the sensing window.

Specifically, the start time of the sensing window includes one of the following:

A121: Start time of the sensing window being a time point corresponding to a first time interval before the terminal triggers resource selection or re-selection That is, in this case, the sensing window is enabled at the time point corresponding to the first time interval before the terminal triggers resource selection or re-selection.

It should be noted that, for example, a time point at which the terminal triggers resource selection or re-selection is n11, and the first time interval is T11; in this case, the start time of the sensing window is n11–T11.

The first time interval is a protocol-predefined, preconfigured, or configured value, for example, a value of T11 may be 32 slots. It should be further noted that the value of T11 may alternatively be 0, indicating that the start time of the sensing window is the time point at which the terminal triggers resource selection or re-selection.

A122: Start time of the sensing window being a time point corresponding to a second time interval after the terminal triggers resource selection or re-selection For example, a time point at which the terminal triggers resource selection is n12, and the second time interval is T12; in this case, the start time of the sensing window is n12+T12. It should be noted that T12 may be a protocol-predefined, preconfigured, or configured value, and T12 being 0 is not excluded.

It should be further noted that, in this case, the end time of the sensing window is one of the following:

A1221: Time point corresponding to a ninth time interval before a transmission resource selected by the terminal For example, a time point of the transmission resource selected by the terminal is n13, and the eighth time interval is T13; in this case, the end time of the sensing window is n13–T13.

A1222: Time point corresponding to a tenth time interval before an end time of the resource selection window For example, the end time of the resource selection window is n14, and the ninth time interval is T14; in this case, the end time of the sensing window is n14–T14.

Specifically, the end time of the sensing window includes:

the end time of the sensing window being a time point corresponding to a third time interval before the terminal triggers resource selection or re-selection.

It should be noted that, for example, a time point at which the terminal triggers resource selection or re-selection is n15, and the third time interval is T15; in this case, the end time point of the sensing window is n15–T15.

The third time interval is a protocol-predefined, preconfigured, or configured value.

Specifically, the position of the sensing window includes one of the following:

A123: Position of the sensing window being determined based on a position of a resource selection window That is, in this case, the method in this embodiment of the present invention further includes: determining the position of the sensing window based on the position of the resource selection window.

Figure 5:
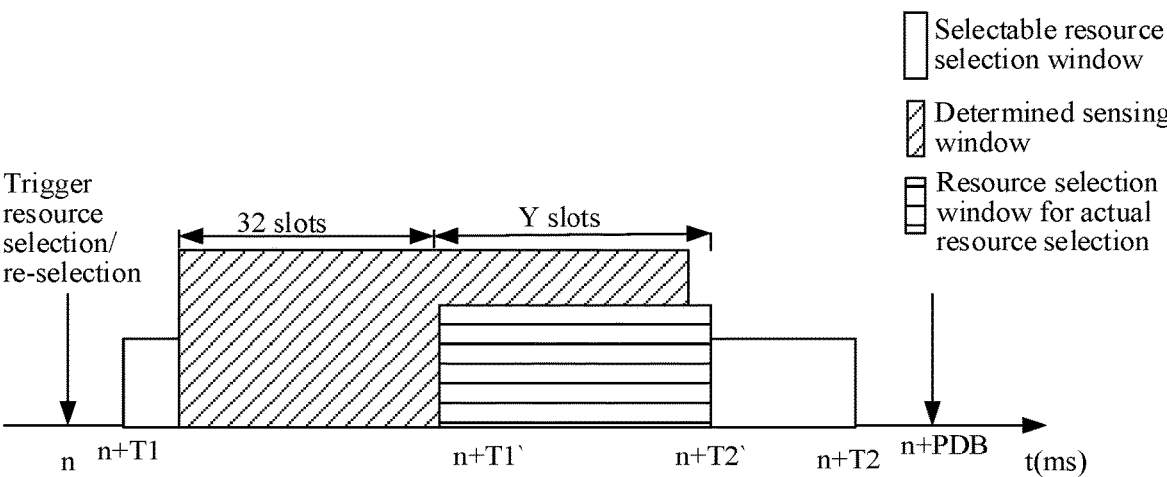
FIG. 5 is a first schematic diagram of a position of a sensing window.

As shown in FIG. 5, when the higher layer configures a partial sensing mode and the higher layer configures a minimum value of the length of the resource selection window (as shown in a part filled with horizontal lines in the figure), the terminal determines a specific size and position of the sensing window, and a configuration range of the selectable sensing window falls within a range of [n+T1, n+T2]. One sensing window is defined as a sensing window of consecutive slots in the resource pool. The sensing window is predefined to start from a T time point (T=32 slots) before a resource selection window (the rectangle filled with horizontal lines in FIG. 5 is the resource selection window), that is, starting from a position of n+T1'–32 in FIG. 5 and ending at a position of n+T2' at which the resource selection window ends. That is, the slashed rectangle in FIG. 5 indicates a range of the sensing window for actual monitoring. It should be noted that, if periodic reservation is not enabled for a resource pool used by the terminal for data transmission, no additional sensing window is defined.

Optionally, in this case, the start time of the sensing window includes at least one of the following:

A1231: Start time of the sensing window being a time point corresponding to a fourth time interval before the resource selection window It should be noted that the resource selection window herein is a range of a resource selection window for partial sensing configured by the higher layer, that is, the terminal performs resource selection in the resource selection window.

For example, the start time of the resource selection window is n16, and the fourth time interval is T16, then the start time of the sensing window is n16–T16.

A1232: Start time of the sensing window being a start time of the resource selection window It should be noted that the start time of the resource selection window is a start time of a resource selection window corresponding to actual resource selection.

For example, if the start time of the resource selection window is n17, the start time of the sensing window is n17.

A1233: Start time of the sensing window being a start time of a selectable resource selection window It should be noted that the selectable resource selection window is not a resource selection window corresponding to actual resource selection by the terminal. Usually, the selectable resource selection window is greater than or equal to the resource selection window corresponding to actual resource selection by the terminal.

For example, if the start time of the selectable resource selection window is n18, the start time of the sensing window is n18.

A1234: Start time of the sensing window being a time point corresponding to a later one of a time point corresponding to a fifth time interval before the resource selection window and the start time of the selectable resource selection window It should be noted that in this case, assuming the start time of the resource selection window being n18, the fifth time interval being T18, and the start time of the selectable resource selection window being n19, if n18–T18 is less than n19, n19 is determined as the start time of the sensing window; or if n18–T18 is greater than n19, n18–T18 is determined as the start time of the sensing window.

A1235: Start time of the sensing window being a time point corresponding to a later one of a time point corresponding to a sixth time interval before the resource selection window and the start time of the resource selection window It should be noted that in this case, assuming the start time of the resource selection window being n20 and the sixth time interval being T20, if n20−T20 is less than n20, n20 is determined as the start time of the sensing window; or if n20−T20 is greater than n20, n20−T20 is determined as the start time of the sensing window.

Optionally, in this case, the end time of the sensing window includes at least one of the following:

A1236: End time of the sensing window being an end time of the resource selection window For example, if the end time of the resource selection window is n21, the end time point of the sensing window is n21.

A1237: End time of the sensing window being a time point corresponding to a seventh time interval before the end time of the resource selection window For example, the end time of the resource selection window is n22, and the seventh time interval is T22. For example, if T22 is 32 slots, the end time of the sensing window is n22−T22.

A1238: End time of the sensing window being a time point corresponding to an eighth time interval before a transmission resource selected by the terminal For example, a start time of the transmission resource selected by the terminal is n23, and the eighth time interval is T23; in this case, the end time of the sensing window is n23−T23. It should be noted that T23 may be a protocol-predefined, preconfigured, or configured value, and T23 being 0 is not excluded.

A124: Position of the sensing window being determined based on a resource that has been selected by the terminal That is, in this case, the method in this embodiment of the present invention further includes: obtaining the position of the sensing window based on the resource that has been selected by the terminal.

It should be noted that the resource that has been selected is selected from the resource selection window (for example, being an earliest time resource in resources selectable for the terminal), and/or the resource that has been selected is a resource reserved by the terminal.

It should be noted that implementation in this case includes at least one of the following:

A1241: Start time of the sensing window being a time point corresponding to an eleventh time interval before the resource that has been selected For example, if the start time of the resource that has been selected is n24 and the eleventh time interval is T24, the start time of the sensing window is n24−T24. It should be noted that T24 is a protocol-predefined, preconfigured, or configured. For example, a value of T24 is 32 slots, or the value of T24 is 32+T3/31+T3/33+T3 slots, where T3 is a processing time for preparation of resource re-selection by the terminal.

It should be further noted that, in this case, if a start time of an obtained sensing window is before a current time, the current time is the start time of the sensing window. Specifically, the current time herein is an absolute time of a specific slot/time point in the resource pool used by the terminal for data transmission.

Further, in this case, the end time of the sensing window is one of the following:

A31: Time point corresponding to a fourteenth time interval before a transmission resource selected by the terminal For example, a time point of the transmission resource selected by the terminal is n25 and the fourteenth time interval is T25; in this case, the end time of the sensing window is n25−T25.

A32: Time point corresponding to a fifteenth time interval before an end time of the resource selection window For example, the end time of the resource selection window is n26 and the fourteenth time interval is T26; in this case, the end time of the sensing window is n26−T26.

A1242: Position of the sensing window being between a time point corresponding to a twelfth time interval before the resource that has been selected and a time point corresponding to a thirteenth time interval before the resource that has been selected It should be noted that, the time point of the resource that has been selected is n27, the twelfth time interval is T_x, and the thirteenth time interval is T_y; in this case, the position of the sensing window is between n27−T_x and n27−T_y. For example, a value of T_x may be 32 slots, or a value of T_x may be 32+T3/31+T3/33+T3 slots, where T3 is a processing time for preparation of resource re-selection by the terminal, and a value of T_y may be T3.

It should be further noted that, in this case, if a start time of an obtained sensing window is before a current time, the current time is the start time of the sensing window. Specifically, the current time herein is an absolute time of a specific slot/time point in the resource pool used by the terminal for data transmission.

It should be further noted that, in this case, if an end time of the obtained sensing window is before the current time, the obtained sensing window becomes invalid.

2. Configuration of Non-Continuous Sensing Windows

It should be noted that, in this case, a defined sensing window is not only related to the position of the resource selection window, but also related to configuration of a period defined in the resource pool used by the terminal for data transmission, or related to a period configured for the terminal. That is, a sensing window determined in this case is a window related to the period and the position of the resource selection window.

It should be noted that, in this case, the configuration information of the sensing window in this embodiment of the present invention includes at least one of the following:

B11: Length configuration parameter of the sensing window

It should be noted that, in this case, a manner of obtaining the length configuration parameter of the sensing window includes:

the length of the sensing window being determined based on a length of a resource selection window.

Specifically, a length of one sensing window is equal to the length of the resource selection window.

B12: Position configuration parameter of the sensing window

It should be noted that, in this case, a manner of obtaining the position configuration parameter of the sensing window includes:

B121: Sensing window being determined based on a position of a resource selection window and a higher-layer parameter indication It should be noted that position configuration information of a sensing window indicated by a higher-layer parameter is k bits (where k is an integer), and a value of a bit length of k is related to at least one of the following:

B1211: Period value of data to be transmitted by the terminal

It should be noted that the value of the bit length of k herein is not necessarily a bit length of k corresponding to a period value in the resource pool configuration.

B1212: Period value configured in a first resource pool

It should be noted that the first resource pool is a resource pool used by the terminal for data transmission.

B1213: Whether periodic reservation being enabled for the first resource pool

It should be noted that, in a case that periodic reservation is enabled for the first resource pool, the value of the bit length of k is determined by the period value of the data to be transmitted by the terminal, a configured period value, or the period value configured in the first resource pool. If periodic reservation is not enabled for the first resource pool, codepoint values of k are set to all 0s.

It should be further noted that k=ceil(slot count corresponding to T_sensingwindow divided by a value of the first period); where ceil(*) represents a round-up function, and T_sensingwindow is a length of a first sensing window. It should be noted that the first sensing window corresponds to a sensing window with periodic reservation enabled as defined in R16. For example, the length of the first sensing window is 1000 ms.

It should be further noted that if the period value described above is one period value, the bit length of k is a value obtained through calculation. If at least two period values are present in the resource pool of the terminal and each period value corresponds to one piece of k-bit information, one of the following is satisfied:

B21: A plurality of k-bit indications being configured by the higher layer

In this case, the sensing window of the terminal is a collection indicated by a plurality of k values. Specifically, different bit lengths of k may have a same size or different sizes. In a case that different bit lengths of k have different sizes and k1, k2, k3, and k4 are respectively obtained for periods T1, T2, T3, and T4 through calculation, the higher layer configures k1, k2, k3, and k4, with four bitmaps indicating the configuration of the sensing window.

B22: One piece of indication information being configured by the higher layer, where a size of the indication information is the largest among bit lengths of a plurality of k values.

For example, if k1, k2, k3, and k4 are respectively obtained for periods T1, T2, T3, and T4, the higher layer configures one k=max(k1, k2, k3, k4) to indicate the sensing window of the terminal.

B122: Sensing window being determined based on a first period

Specifically, the first period includes at least one of the following:

B1221: a period configured for the terminal;
B1222: a period configured for a resource pool; and
B1223: a period of data to be transmitted by the terminal.

It should be further noted that the first period includes at least one period value, and the at least one period value corresponds to at least one of the following:

B31: at least one period value configured via RRC;
B32: at least one period value indicated by SCI; and
B33: at least one period value indicated by DCI.

It should be noted that a processing case herein is that at least one period value is configured via RRC and one or more of the period values configured via RRC are indicated by SCI or DCI.

It should be further noted that a minimum number (Num_P) of first periods used by the terminal for monitoring is protocol-predefined, preconfigured, or configured.

It should be noted that when the first period includes at least one period value, the first period indicates a period set, and period values of the period set in use or indexes of periods in the period set are specified in the RRC preconfiguration/RRC configuration/MAC CE indication/DCI indication/SCI indication.

It should be further noted that Num_P periods with largest/smallest values in the period set or Num_P periods with largest/smallest indexes are specifically indicated.

Figure 6:
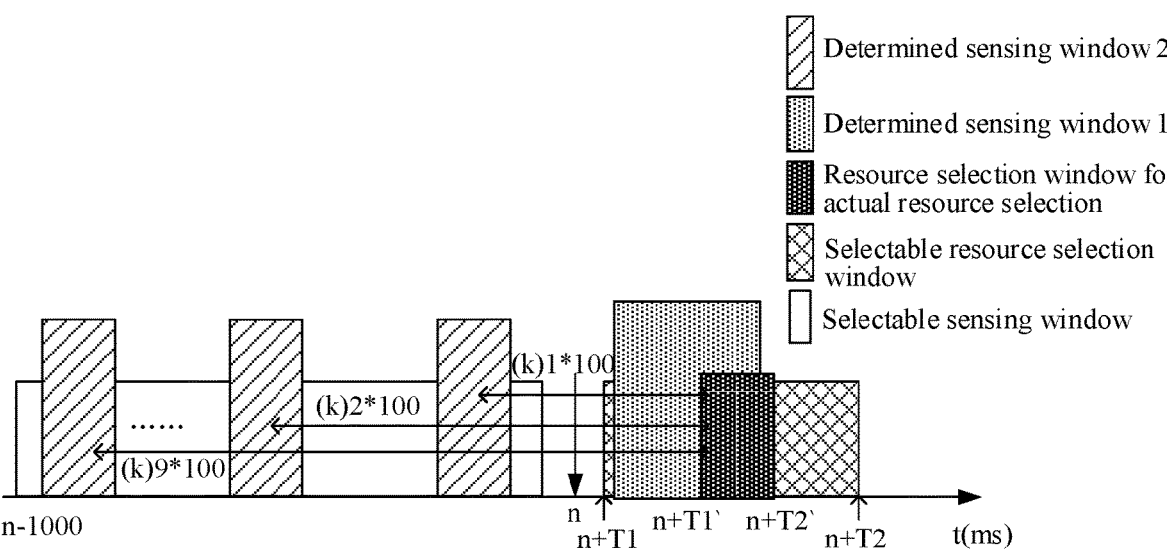
FIG. 6 is a second schematic diagram of a position of a sensing window.

For example, in a case that only one k is configured, as shown in FIG. 6, when the higher layer configures a partial sensing mode and the higher layer configures a minimum value of the length of the resource selection window, the higher layer configures and determines a specific size and position of the selection window, and a configuration range falls within a range of [n+T1, n+T2]. One sensing window 1 is defined as a sensing window of consecutive T=32 (logical) slots in the resource pool, starting from a T time point before the resource selection window, that is, starting from a position of n+T1'−32 in FIG. 6 and ending at a position of n+T2' at which the resource selection window ends.

If periodic reservation is enabled for the resource pool, a sensing window 2 is defined. If a value of k for partial sensing configured by the higher layer is 10 bits, it is indicated as 0100000011, and if a period configured by the higher layer for the resource pool is 100 ms/100 slots, a position of the sensing window 2 is [n+T1'−100*k, n+T2'−100*k]. To be specific, [n+T1'−900, n+T2'−900], [n+T1'−200, n+T2'−200], [n+T1'−100, n+T2'−100] all correspond to the sensing window 2, and specifically, the determined sensing windows 2 are shown in the slashed rectangles in the figure.

Figure 7:
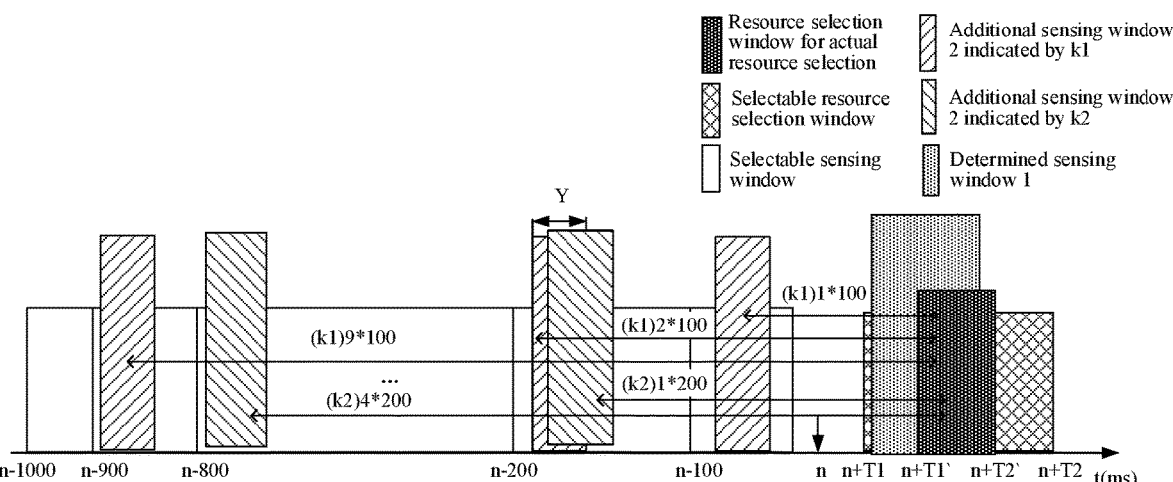
FIG. 7 is a third schematic diagram of a position of a sensing window.

For example, when only a plurality of ks are configured, as shown in FIG. 7, when the higher layer configures a partial sensing mode and the higher layer configures a minimum value of the length of the resource selection window, the higher layer configures and determines a specific size and position of the selection window, and a configuration range falls within a range of [n+T1, n+T2]. One sensing window 1 is defined as a sensing window of consecutive T=32 slots in the resource pool, starting from a T time point before the resource selection window, that is, starting from a position of n+T1'−32 in FIG. 7 and ending at a position of n+T2' at which the resource selection window ends.

If periodic reservation is enabled for the resource pool, a sensing window 2 is defined. Configured periods are 100 ms and 200 ms. If a value of k for partial sensing configured by the higher layer is k1 being 10 bits (1000 divided by 100 equals 10) for the period of 100 ms, the position of the sensing window is [n+T1'−100*k1, n+T2'−100*k1]; and if it is indicated as 0100000011, the corresponding sensing window 2 is [n+T1'−900, n+T2'−900], [n+T1'−200, n+T2'−200], and [n+T1'−100, n+T2'−100]. For the period of 200 ms, k2 is 5 bits (1000 divided by 200 equals 5) and the position of the sensing window 2 is [n+T1'−200*k2, n+T2'−200*k2]; and if it is indicated as 01001, the corresponding sensing window is [n+T1'−800, n+T2'−800] and [n+T1'−200, n+T2'−200]. In other words, [n+T1'−900, n+T2'−900],

[n+T1'−800, n+T2'−800], [n+T1'−200, n+T2'−200], and [n+T1'−100, n+T2'−100] all correspond to the sensing window 2.

It should be noted that two configuration manners of the sensing window are described above. If only one configuration manner is provided in this embodiment of the present invention, the terminal may determine the sensing window in this configuration manner; or if two configuration manners are provided in this embodiment of the present invention, in the partial sensing mechanism, the terminal triggers a corresponding sensing window if the following conditions are satisfied.

Condition 1: If periodic reservation is enabled, the sensing windows defined in the foregoing two manners are triggered; or if periodic reservation is enabled, the sensing window defined in the second manner is triggered.

Condition 2: If periodic reservation is not enabled, the sensing window defined in the first manner is triggered.

Condition 3: Triggering of the sensing windows in the foregoing two manners is specified in higher-layer configuration/preconfiguration.

Specifically, it may be an explicit configuration or an implicit configuration. Specifically, condition 1 and condition 2 are manners of implicit configuration.

It should be further noted that, in order to obtain an accurate resource selection window, before step 403, this embodiment of the present invention further includes:

obtaining configuration information of a resource selection window in the partial sensing mechanism.

It should be noted that if the resource selection window indicated by the configuration information is part of a selectable resource selection window, and the terminal needs to perform resource selection only in the configured part of the resource selection window.

It should be noted that the terminal transmits sidelink information, including PSCCH/PSSCH/PSFCH/sidelink reference signal (SL RS), within the resource selection window described in this embodiment of the present invention.

Specifically, the configuration information of the resource selection window includes at least one of the following:

C11: Length configuration parameter of the resource selection window

It should be noted that the length configuration parameter of the resource selection window includes one of the following:

C111: Length of the resource selection window

It should be noted that a specific value of the length of the resource selection window is directly limited herein.

C112: Minimum value of the length of the resource selection window

Specifically, in this case, the minimum value means that the length of the resource selection window is determined by the terminal itself, and a maximum value of the length of the resource selection window is not set herein provided that the length of the resource selection window determined by the terminal is greater than the minimum value.

C113: Length range of the resource selection window

It should be noted that the length range herein refers to a maximum value and a minimum value that confine the length of the resource selection window, and the length of the resource selection window determined by the terminal needs to fall between the maximum value and the minimum value.

C114: Length ratio of the resource selection window

It should be noted that the ratio herein is a ratio of a length of a resource selection window to be selected by the terminal to a length of a resource selection window selectable by the terminal.

C12: Position configuration parameter of the resource selection window

Specifically, in this case, the start time of the resource selection window includes at least one of the following:

C121: Start time of the resource selection window being at least from a time point corresponding to a fourteenth time interval after triggering of resource selection For example, a time point of triggering resource selection is n, and the fourteenth time interval is T_gap1. Specifically, T_gap is a value that is protocol-predefined, or preconfigured or configured by the higher layer. For example, T_gap1 is 32 slots, and then the start time of the resource selection window is from at least n+T_gap1.

C122: Start time of the resource selection window being greater than or equal to a time point corresponding to a fifteenth time interval after triggering of resource selection For example, if a time point of triggering resource selection is n, and the fifteenth time interval is T_gap2, the start time of the resource selection window needs to be greater than or equal to a time point corresponding to n+T_gap2.

C123: Start time of the resource selection window being from n+T1 n is a triggering time point of resource selection (that is, the time point of triggering resource selection), and T1 is a protocol-defined minimum time of resource selection.

Specifically, in this case, when the configuration information includes the position configuration parameter of the resource selection window, an end time of the resource selection window includes at least one of the following:

C124: End time of the resource selection window falling within a range smaller than a delay budget (PDB) of a data packet C125: End time of the resource selection window falling within a range of a first preset time after triggering of resource selection It should be noted that the first preset time is a resource selection time limit for selection by the terminal.

It should be further noted that, in this embodiment of the present invention, the end time T2 of the resource selection window or a maximum value of T2 may be alternatively protocol-defined or configured. For example, a maximum value T2_max of an end time of an actually determined resource selection window is W, or T2_max=min.(W, remaining PDB). This manner helps reduce the length of the sensing window.

Further, it should be further noted that, after step 403, this embodiment of the present invention further includes:

in the partial sensing mechanism, if a first condition is satisfied, performing, by the terminal, at least one of the following:

D11: Triggering a resource selection window.

It should be noted that, in this case, the terminal needs to trigger a new resource selection window.

Optionally, a position of the resource selection window is subject to a limit same as that applied to a position of the first resource selection window of the terminal, that is, falling within a range of PDB of the first data packet and/or within a range of a resource selection time limit for selection by the terminal. Optionally, the position of the resource selection window is subject to a limit different from that applied to a position of the first resource selection window of the terminal, and a range of a resource selection time limit for new selection by the terminal is the range of the resource selection window.

It should be further noted that the size of the resource selection window is the same as the size of the first resource selection window, or is an independently configured length, or is a size of the first resource selection window multiplied by a scaling factor.

D12: In a case that periodic reservation is enabled, transmitting, by the terminal on a selectable resource of a next period, a to-be-retransmitted current transport block (TB) corresponding to a first data packet.

D13: Discarding the first data packet.

Specifically, the first condition includes one of the following:

E11: The terminal has received a non-acknowledgement (NACK) of the first data packet in the resource selection window, and the terminal has no reserved resources or the terminal has no dynamically reserved resources.

E12: The terminal has received discontinuous transmission (DTX) of the first data packet in the resource selection window, and the terminal has no reserved resources or the terminal has no dynamically reserved resources.

It should be noted that in this case, the terminal has sent the first data packet, but has not received any feedback information at a feedback position corresponding to the first data packet. This case may be equivalent that the terminal has received a NACK.

E13: The terminal has received no acknowledgement information (ACK) of the first data packet in the resource selection window, and the terminal has no reserved resources or the terminal has no dynamically reserved resources.

Figure 8:
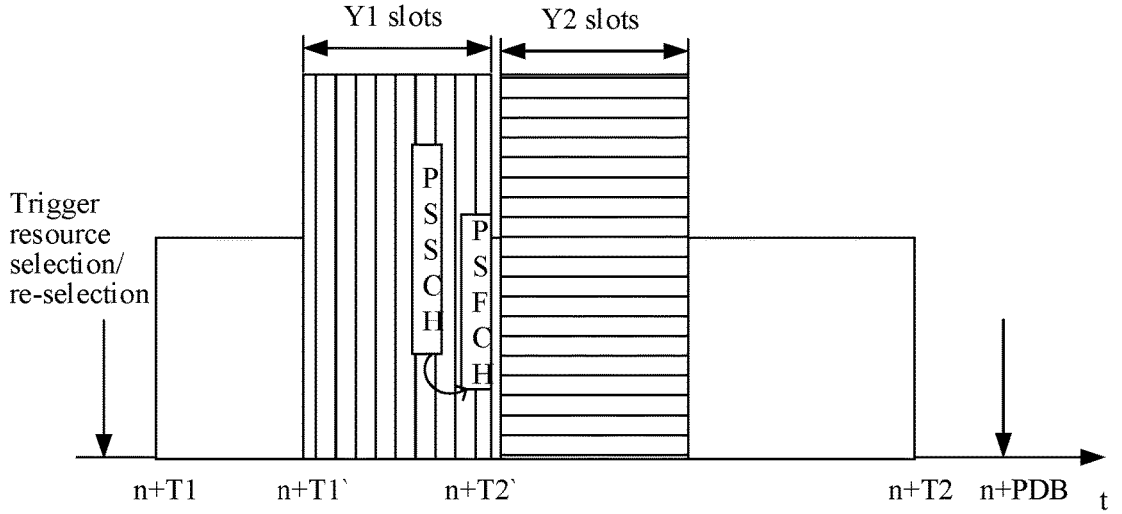
FIG. 8 is a schematic diagram of a position of a newly triggered resource selection window.

For example, as shown in FIG. 8, if the terminal receives a NACK/DTX, and at that time the terminal cannot perform resource selection in the resource selection window [n+T1', n+T2'] (as shown in the rectangle filled with vertical lines in the figure) configured by the higher layer, the terminal triggers a new resource selection window (shown by the rectangle filled with horizontal lines in the figure) within a range of the PDB, and a length Y2 of the new resource selection window is a value configured by the higher layer.

It should be noted that a time unit of the start time, end time, time interval, time range, or the like described in this embodiment of the present invention may be any one of millisecond (ms), slot, sub-slot, logical slot, logical sub-slot, sub-frame, transmission time interval (TTI), and absolute time. Certainly, a time unit other than the foregoing time units is not excluded in this embodiment of the present invention.

It should be noted that this embodiment of the present invention may be applied to terminals in NR sidelink. In NR sidelink, with the manner in this embodiment of the present invention, the terminal does not need to continuously monitor the system, thereby saving power of terminals during monitoring and improving energy efficiency of the terminals.

Figure 9:
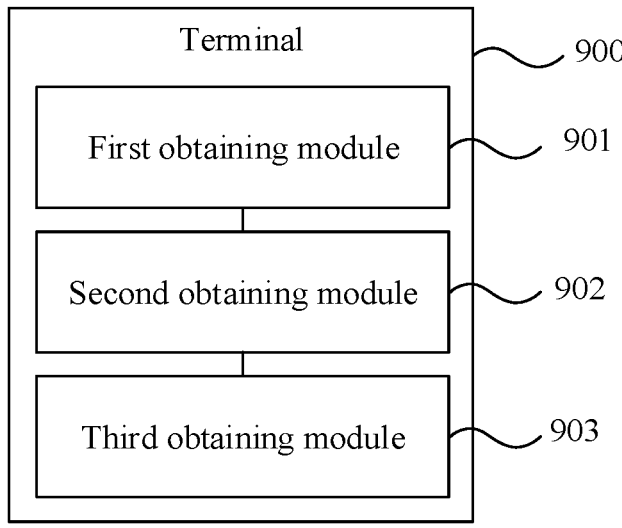
FIG. 9 is a schematic modular diagram of a terminal according to an embodiment of the present invention.

As shown in FIG. 9, an embodiment of the present invention provides a terminal 900, including:

a first obtaining module 901, configured to obtain configuration information of a sensing window in a partial sensing mechanism;

a second obtaining module 902, configured to perform monitoring in the sensing window indicated by the configuration information to obtain a monitoring result; and a third obtaining module 903, configured to obtain a selectable resource set based on the monitoring result.

Specifically, the configuration information of the sensing window includes at least one of the following:

a length configuration parameter of the sensing window; and a position configuration parameter of the sensing window.

Further, the length configuration parameter of the sensing window includes at least one of the following:

a length of the sensing window;

a minimum value of the length of the sensing window; and a length range of the sensing window.

Further, the length configuration parameter of the sensing window includes at least one of the following:

a protocol-predefined parameter;

a parameter configured via radio resource control RRC;

a parameter indicated by a medium access control control element MAC CE;

a parameter indicated by downlink control information DCI;

a parameter indicated by sidelink control information SCI;

a parameter that is determined based on a start time and/or an end time of a resource selection window; and a length configuration parameter of the sensing window that is determined based on a length of the resource selection window.

Further, the position configuration parameter of the sensing window includes at least one of a start time of the sensing window, an end time of the sensing window, and a position of the sensing window.

The start time of the sensing window includes one of the following:

the start time of the sensing window being a time point corresponding to a first time interval before the terminal triggers resource selection or re-selection; and the start time of the sensing window being a time point corresponding to a second time interval after the terminal triggers resource selection or re-selection.

The end time of the sensing window includes:

the end time of the sensing window being a time point corresponding to a third time interval before the terminal triggers resource selection or re-selection.

The position of the sensing window includes one of the following:

the position of the sensing window being determined based on a position of a resource selection window; and the position of the sensing window being determined based on a resource that has been selected by the terminal.

Specifically, the first time interval and/or the third time interval are protocol-predefined, preconfigured, or configured values.

Optionally, if the position of the sensing window is determined based on the position of the resource selection window, the start time of the sensing window includes at least one of the following:

the start time of the sensing window being a time point corresponding to a fourth time interval before the resource selection window;

the start time of the sensing window being a start time of the resource selection window;

the start time of the sensing window being a start time of a selectable resource selection window;

the start time of the sensing window being a time point corresponding to a later one of a time point corresponding to a fifth time interval before the resource selection window and the start time of the selectable resource selection window; and the start time of the sensing window being a time point corresponding to a later one of a time point corresponding to a sixth time interval before the resource selection window and the start time of the resource selection window.

Optionally, if the position of the sensing window is determined based on the position of the resource selection window, the end time of the sensing window includes at least one of the following:

the end time of the sensing window being an end time of the resource selection window;

the end time of the sensing window being a time point corresponding to a seventh time interval before the end time of the resource selection window; and the end time of the sensing window being a time point corresponding to an eighth time interval before a transmission resource selected by the terminal.

Optionally, in a case that the start time of the sensing window is the time point corresponding to the second time interval after the terminal triggers resource selection or re-selection, the end time of the sensing window is:

a time point corresponding to a ninth time interval before a transmission resource selected by the terminal; or a time point corresponding to a tenth time interval before an end time of the resource selection window.

Optionally, the position of the sensing window being determined by the resource that has been selected by the terminal includes at least one of the following:

the start time of the sensing window being a time point corresponding to an eleventh time interval before the resource that has been selected; and the position of the sensing window being between a time point corresponding to a twelfth time interval before the resource that has been selected and a time point corresponding to a thirteenth time interval before the resource that has been selected.

Specifically, in a case that the start time of the sensing window is the time point corresponding to the eleventh time interval before the resource that has been selected, and a start time of an obtained sensing window is before a current time, the current time is the start time of the sensing window.

Specifically, in a case that the start time of the sensing window is the time point corresponding to the eleventh time interval before the resource that has been selected, the end time of the sensing window is:

a time point corresponding to a fourteenth time interval before a transmission resource selected by the terminal; or a time point corresponding to a fifteenth time interval before an end time of the resource selection window.

Specifically, in a case that the position of the sensing window is between the time point corresponding to the twelfth time interval before the resource that has been selected and the time point corresponding to the thirteenth time interval before the resource that has been selected, and a start time of an obtained sensing window is before a current time, the current time is the start time of the sensing window.

Specifically, in a case that the position of the sensing window is between the time point corresponding to the twelfth time interval before the resource that has been selected and the time point corresponding to the thirteenth time interval before the resource that has been selected, and an end time of an obtained sensing window is before a current time, the obtained sensing window becomes invalid.

Optionally, a manner of obtaining the position configuration parameter of the sensing window includes:

the sensing window being determined based on a position of a resource selection window and a higher-layer parameter indication; and the sensing window being determined based on a first period.

Further, the first period includes at least one of the following:

a period configured for the terminal;

a period configured for a resource pool; and a period of data to be transmitted by the terminal.

Further, position configuration information of a sensing window indicated by a higher-layer parameter is k bits, and a value of a bit length of k is related to at least one of the following:

a period value of data to be transmitted by the terminal;

a period value configured in a first resource pool; and whether periodic reservation is enabled for the first resource pool; where k is an integer.

Specifically, in a case that periodic reservation is enabled for the first resource pool, the value of the bit length of k is determined by the period value of the data to be transmitted by the terminal, a configured period value, or the period value configured in the first resource pool.

Specifically, $k=\mathrm{ceil}(\text{slot count corresponding to } T\_\mathrm{sensingwindow}$ divided by a value of the first period); where ceil(*) represents a round-up function, and T_sensingwindow is a length of a first sensing window.

Specifically, in a case that there are at least two period values in a resource pool in which the terminal is located, and each period value corresponds to one piece of k-bit information:

a plurality of k-bit indications are configured by the higher layer; or one piece of indication information is configured by the higher layer, where a size of the indication information is a maximum value of a plurality of bit lengths of k.

Further, the first period includes at least one period value, and the at least one period value corresponds to at least one of the following:

at least one period value configured via radio resource control RRC;

at least one period value indicated by side link control information SCI; and at least one period value indicated by downlink control information DCI.

Further, a minimum number for the first period used by the terminal for monitoring is protocol-predefined, preconfigured, or configured.

Optionally, before the third obtaining module 901 obtains the selectable resource set based on the monitoring result, the terminal further includes:

a fourth obtaining module, configured to obtain configuration information of a resource selection window in the partial sensing mechanism; where the configuration information of the resource selection window includes at least one of the following:

a length configuration parameter of the resource selection window; and a position configuration parameter of the resource selection window.

Specifically, the length configuration parameter of the resource selection window includes one of the following:

a length of the resource selection window;

a minimum value of the length of the resource selection window;

a length range of the resource selection window; and a length ratio of the resource selection window.

Further, the length ratio of the resource selection window is:a ratio of a length of a resource selection window to be selected by the terminal to a length of a resource selection window selectable by the terminal.

Specifically, in a case that the configuration information includes the position configuration parameter of the resource selection window, a start time of the resource selection window includes at least one of the following:

the start time of the resource selection window being at least from a time point corresponding to a fourteenth time interval after triggering of resource selection;

the start time of the resource selection window being greater than or equal to a time point corresponding to a fifteenth time interval after triggering of resource selection; and the start time of the resource selection window being from n+T1; where n is a time point of triggering resource selection, and T1 is a protocol-defined minimum time of resource selection.

Specifically, when the configuration information includes the position configuration parameter of the resource selection window, an end time of the resource selection window includes at least one of the following:

the end time of the resource selection window falling within a range smaller than a delay budget PDB of a data packet; and the end time of the resource selection window falling within a range of a first preset time after triggering of resource selection.

Optionally, after the third obtaining module 903 obtains the selectable resource set based on the monitoring result, the terminal further includes:

an execution module, configured to: in the partial sensing mechanism, if a first condition is satisfied, perform, for the terminal, at least one of the following:

triggering a resource selection window;

in a case that periodic reservation is enabled, transmitting, by the terminal on a selectable resource of a next period, a to-be-retransmitted current transport block corresponding to a first data packet; and discarding the first data packet.

Further, the first condition includes one of the following:

the terminal has received a non-acknowledgement of the first data packet in the resource selection window, and the terminal has no reserved resources or the terminal has no dynamically reserved resources;

the terminal has received discontinuous transmission DTX of the first data packet in the resource selection window, and the terminal has no reserved resources or the terminal has no dynamically reserved resources; and the terminal has received no acknowledgement information for the first data packet in the resource selection window, and the terminal has no reserved resources or the terminal has no dynamically reserved resources.

It should be noted that the terminal embodiment is a terminal corresponding to the foregoing resource selection method applied to the terminal. All the implementations of the foregoing embodiment are applicable to the terminal embodiment, with the same technical effects achieved.

Figure 10:
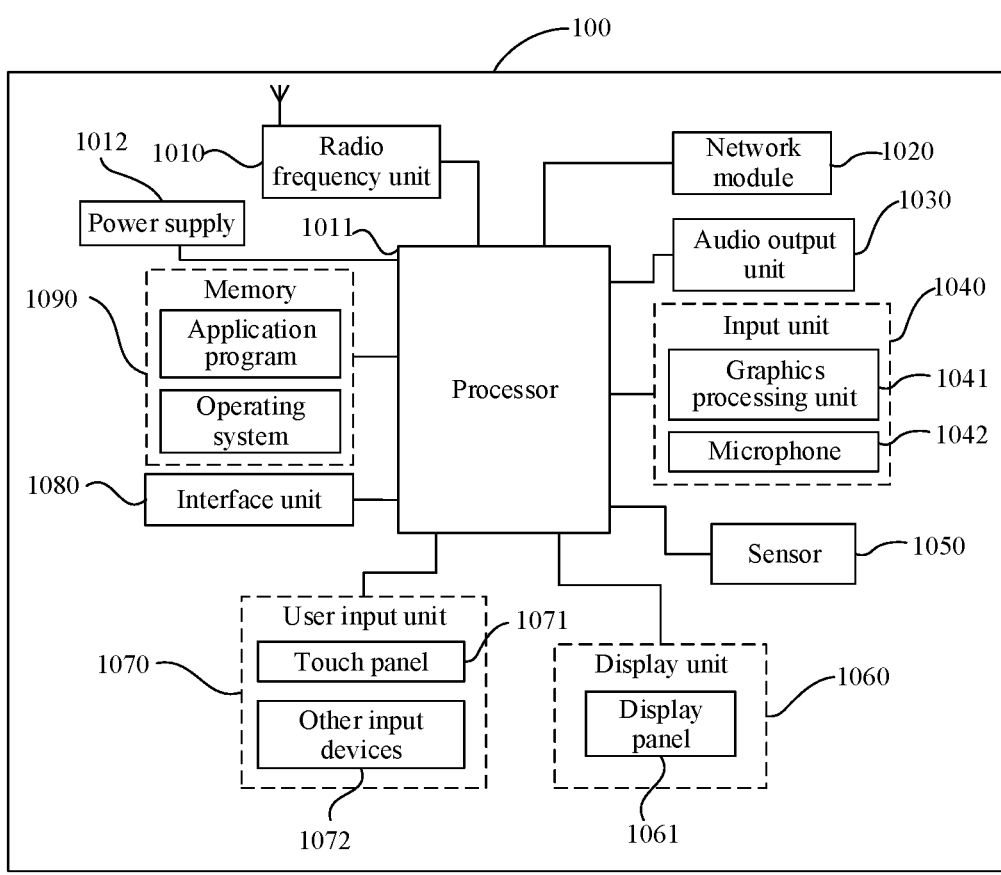
FIG. 10 is a structural block diagram of a terminal according to an embodiment of the present invention.

FIG. 10 is a schematic diagram of a hardware structure of a terminal for implementing the embodiments of the present invention.

The terminal 100 includes but is not limited to components such as a radio frequency unit 1010, a network module 1020, an audio output unit 1030, an input unit 1040, a sensor 1050, a display unit 1060, a user input unit 1070, an interface unit 1080, a memory 1090, a processor 1011, and a power supply 1012. A person skilled in the art may understand that the structure of the terminal shown in FIG. 10 does not constitute any limitation on the terminal device. The terminal may include more or fewer components than those shown in the figure, or a combination of some components, or the components disposed differently. In this embodiment of the present invention, the terminal includes, but is not limited to, a mobile phone, a tablet computer, a laptop computer, a personal digital assistant, an in-vehicle terminal, a wearable device, a pedometer, and the like.

The processor 1011 is configured to obtain configuration information of a sensing window in a partial sensing mechanism; perform monitoring in the sensing window indicated by the configuration information to obtain a monitoring result; and obtain a selectable resource set based on the monitoring result.

The terminal in this embodiment of the present invention obtains the sensing window according to the configuration information of the sensing window in the partial sensing mechanism, where the sensing window is part of resources in a selectable sensing window, that is, the terminal needs to perform monitoring only in a subset of the selectable sensing window, thereby reducing power consumption of the terminal during monitoring.

It should be understood that in this embodiment of the present invention, the radio frequency unit 1010 may be configured to receive and send information, or to receive and send a signal in a call process, and specially, after receiving downlink data from a network-side device, send the downlink data to the processor 1011 for processing; and also send uplink data to the network-side device. Generally, the radio frequency unit 1010 includes but is not limited to an antenna, at least one amplifier, a transceiver, a coupler, a low noise amplifier, a duplexer, and the like. In addition, the radio frequency unit 1010 may also communicate with a network and other devices via a wireless communications system.

The terminal provides a user with wireless broadband internet access through the network module 1020, for example, helping the user to send and receive e-mails, browse web pages, and access streaming media.

The audio output unit 1030 may convert audio data received by the radio frequency unit 1010 or the network module 1020 or stored in the memory 1090 into an audio signal and output the audio signal as a sound. Furthermore, the audio output unit 1030 may also provide audio output (for example, a call signal received sound or a message received sound) related to a specific function performed by the terminal 100. The audio output unit 1030 includes a speaker, a buzzer, a receiver, and the like.

The input unit 1040 is configured to receive an audio or video signal. The input unit 1040 may include a graphics processing unit (GPU) 1041 and a microphone 1042. The graphics processing unit 1041 processes image data of a still picture or a video obtained by an image capture apparatus (for example, a camera) in an image capture mode or a video capture mode. A processed image frame may be displayed on the display unit 1060. The image frame processed by the graphics processing unit 1041 may be stored in the memory 1090 (or another storage medium) or be transmitted by the radio frequency unit 1010 or the network module 1020. The microphone 1042 is capable of receiving sounds and processing such sounds into audio data. The processed audio data can be converted into a format output that can be sent to a mobile communication network device through the radio frequency unit 1010 in a telephone call mode.

The terminal 100 further includes at least one sensor 1050, for example, an optical sensor, a motion sensor, and other sensors. Specifically, the optical sensor may include an ambient light sensor and a proximity sensor. The ambient light sensor may adjust luminance of the display panel 1061 based on brightness of ambient light, and the proximity sensor may turn off the display panel 1061 and/or backlight when the terminal 100 moves close to an ear. As a type of motion sensor, an accelerometer sensor can detect magnitudes of accelerations in all directions (usually three axes), can detect a magnitude and a direction of gravity when the mobile phone is in a static state, and can be applied to posture recognition (such as screen switching between portrait and landscape, related games, and magnetometer posture calibration) of the terminal, functions related to vibration recognition (such as pedometer and tapping), and the like. The sensor 1050 may also include a fingerprint sensor, a pressure sensor, an iris sensor, a molecular sensor, a gyroscope, a barometer, a hygrometer, a thermometer, an infrared sensor, and the like. Details are not described herein.

The display unit 1060 is configured to display information input by the user or information provided to the user. The display unit 1060 may include a display panel 1061, and the display panel 1061 may be configured in a form of a liquid crystal display (LCD), an organic light-emitting diode (OLED), or the like.

The user input unit 1070 may be configured to: receive a digit or character information that is input, and generate signal input related to user settings and function control of the terminal. Specifically, the user input unit 1070 may include a touch panel 1071 and other input devices 1072. The touch panel 1071 is also referred to as a touchscreen and can collect a touch operation (such as an operation performed by the user on the touch panel 1071 or near the touch panel 1071 with a finger or by using any proper object or accessory such as a stylus) of the user on or near the touch panel 1071. The touch panel 1071 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and transmits the touchpoint coordinates to the processor 1011, and can receive a command transmitted by the processor 1011 and execute the command. In addition, the touch panel 1071 may be implemented in a plurality of forms, for example, as a resistive, capacitive, infrared, or surface acoustic wave touch panel. The user input unit 1070 may further include the other input devices 1072 in addition to the touch panel 1071. Specifically, the other input devices 1072 may include but are not limited to a physical keyboard, a function key (such as a volume control key or an on/off key), a trackball, a mouse, and a joystick. Details are not described herein.

Further, the touch panel 1071 may cover the display panel 1061. When detecting a touch operation on or near the touch panel 1071, the touch panel 1071 transmits the touch operation to the processor 1011 to determine a type of a touch event. Then, the processor 1011 provides a corresponding visual output on the display panel 1061 based on the type of the touch event. In FIG. 10, the touch panel 1071 and the display panel 1061 serve as two independent components to implement input and output functions of the terminal. In some embodiments, however, the touch panel 1071 may be integrated with the display panel 1061 to implement the input and output functions of the terminal. This is not specifically limited herein.

The interface unit 1080 is an interface between an external apparatus and the terminal 100. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 1080 may be configured to: receive input (for example, data information and power) from the external apparatus, and transmit the received input to one or more elements in the terminal 100, or may be configured to transmit data between the terminal 100 and the external apparatus.

The memory 1090 may be configured to store software programs and various data. The memory 1090 may mainly include a program storage area and a data storage area. The program storage area may store an operating system, and an application program required by at least one function (for example, a sound playback function or an image playback function). The data storage area may store data (for example, audio data or a phone book) created according to use of the mobile phone. In addition, the memory 1090 may include a high-speed random access memory, and may further include a non-volatile memory such as at least one disk storage device, a flash memory device, or another volatile solid-state storage device.

The processor 1011 is a control center of the terminal, and is connected to all components of the terminal by using various interfaces and lines. By running or executing a software program and/or module that is stored in the memory 1090 and calling data stored in the memory 1090, the processor 1011 executes various functions of the terminal and processes data, so as to perform overall monitoring on the terminal. The processor 1011 may include one or more processing units. Preferably, the processor 1011 may integrate an application processor and a modem processor. The application processor mainly processes the operating system, a user interface, an application program, and the like. The modem processor mainly processes wireless communication. It can be understood that the modem processor may alternatively be not integrated in the processor 1011.

The terminal 100 may further include the power supply 1012 (such as a battery) supplying power to each component. Preferably, the power supply 1012 may be logically connected to the processor 1011 by using a power management system, so that functions such as charge and discharge management and power consumption management are implemented by using the power management system.

In addition, the terminal 100 includes some functional modules that are not illustrated. Details are not described herein.

Preferentially, an embodiment of the present invention further provides a terminal, including a processor 1011, a memory 1090, and a computer program stored in the memory 1090 and capable of running on the processor 1011. When the computer program is executed by the processor 1011, the processes of the foregoing embodiment of the resource selection method applied to the terminal side can be implemented, with the same technical effects achieved. To avoid repetition, details are not described herein again.

An embodiment of the present invention further provides a computer-readable storage medium, where a computer program is stored in the computer-readable storage medium. When the computer program is executed by a processor, the processes of the foregoing embodiment of the resource selection method applied to the terminal side can be implemented, with the same technical effects achieved. To avoid repetition, details are not described herein again. The computer-readable storage medium is, for example, a read-only memory (ROM), a random access memory (RAM), a magnetic disk, or an optical disc.

Figure 11:
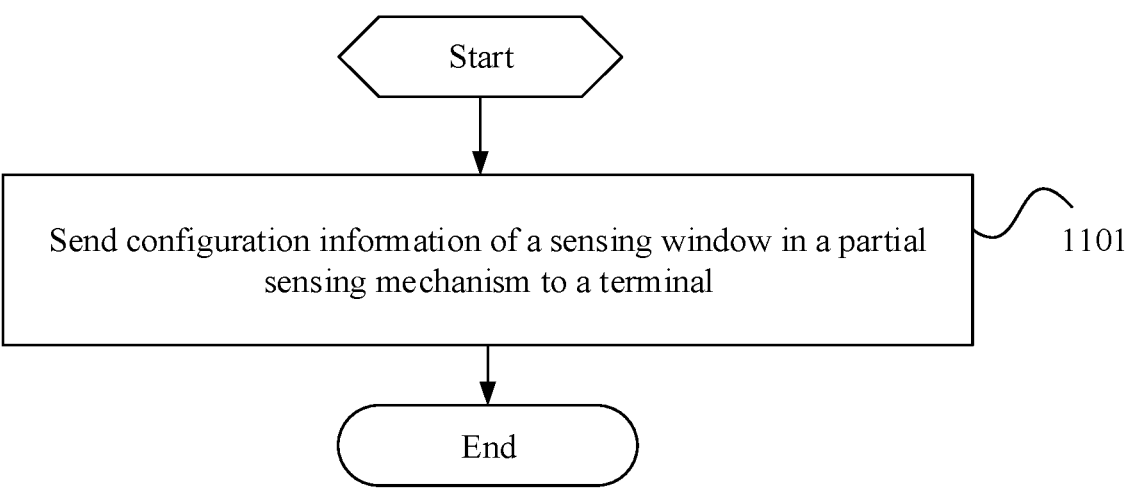
FIG. 11 is a second schematic flowchart of a resource selection method according to an embodiment of the present invention.

As shown in FIG. 11, an embodiment of the present invention further provides a resource selection method, applied to a network-side device and including:

Step 1101: Send configuration information of a sensing window in a partial sensing mechanism to a terminal.

Further, the configuration information of the sensing window includes at least one of the following:

a length configuration parameter of the sensing window; and a position configuration parameter of the sensing window.

Optionally, the length configuration parameter of the sensing window includes at least one of the following:

a length of the sensing window;

a minimum value of the length of the sensing window; and a length range of the sensing window.

Optionally, the position configuration parameter of the sensing window includes at least one of a start time of the sensing window, an end time of the sensing window, and a position of the sensing window.

The start time of the sensing window includes one of the following:

the start time of the sensing window being a time point corresponding to a first time interval before the terminal triggers resource selection or re-selection; and the start time of the sensing window being a time point corresponding to a second time interval after the terminal triggers resource selection or re-selection.

The end time of the sensing window includes:

the end time of the sensing window being a time point corresponding to a third time interval before the terminal triggers resource selection or re-selection.

The position of the sensing window includes one of the following:

the position of the sensing window being determined based on a position of a resource selection window; and the position of the sensing window being determined based on a resource that has been selected by the terminal.

Further, if the position of the sensing window is determined based on the position of the resource selection window, the start time of the sensing window includes at least one of the following:

the start time of the sensing window being a time point corresponding to a fourth time interval before the resource selection window;

the start time of the sensing window being a start time of the resource selection window;

the start time of the sensing window being a start time of a selectable resource selection window;

the start time of the sensing window being a time point corresponding to a later one of a time point corresponding to a fifth time interval before the resource selection window and the start time of the selectable resource selection window; and the start time of the sensing window being a time point corresponding to a later one of a time point corresponding to a sixth time interval before the resource selection window and the start time of the resource selection window.

Further, if the position of the sensing window is determined based on the position of the resource selection window, the end time of the sensing window includes at least one of the following:

the end time of the sensing window being an end time of the resource selection window;

the end time of the sensing window being a time point corresponding to a seventh time interval before the end time of the resource selection window; and the end time of the sensing window being a time point corresponding to an eighth time interval before a transmission resource selected by the terminal.

Further, in a case that the start time of the sensing window is the time point corresponding to the second time interval after the terminal triggers resource selection or re-selection, the end time of the sensing window is:

a time point corresponding to a ninth time interval before a transmission resource selected by the terminal; or a time point corresponding to a tenth time interval before an end time of the resource selection window.

Further, the position of the sensing window being determined by the resource that has been selected by the terminal includes at least one of the following:

the start time of the sensing window being a time point corresponding to an eleventh time interval before the resource that has been selected; and the position of the sensing window being between a time point corresponding to a twelfth time interval before the resource that has been selected and a time point corresponding to a thirteenth time interval before the resource that has been selected.

Further, in a case that the start time of the sensing window is the time point corresponding to the eleventh time interval before the resource that has been selected, the end time of the sensing window is:

a time point corresponding to a fourteenth time interval before a transmission resource selected by the terminal; or a time point corresponding to a fifteenth time interval before an end time of the resource selection window.

Optionally, a manner of obtaining the length configuration parameter of the sensing window includes:

the length of the sensing window being determined based on a length of a resource selection window.

Optionally, a manner of obtaining the position configuration parameter of the sensing window includes:

the sensing window being determined based on a position of a resource selection window and a higher-layer parameter indication; and the sensing window being determined based on a first period.

Specifically, the first period includes at least one of the following:

a period configured for the terminal;

a period configured for a resource pool; and a period of data to be transmitted by the terminal.

Specifically, position configuration information of a sensing window indicated by a higher-layer parameter is k bits, and a value of a bit length of k is related to at least one of the following:

a period value of data to be transmitted by the terminal;

a period value configured in a first resource pool; and whether periodic reservation is enabled for the first resource pool; where k is an integer.

Optionally, in a case that periodic reservation is enabled for the first resource pool, the value of the bit length of k is determined by the period value of the data to be transmitted by the terminal, a configured period value, or the period value configured in the first resource pool.

Specifically, k=ceil(slot count corresponding to T_sensingwindow divided by a value of the first period); where ceil(*) represents a round-up function, and T_sensingwindow is a length of a first sensing window.

Specifically, in a case that there are at least two period values in a resource pool in which the terminal is located, and each period value corresponds to one piece of k-bit information:

a plurality of k-bit indications are configured by the higher layer; or one piece of indication information is configured by the higher layer, where a size of the indication information is a maximum value of a plurality of bit lengths of k.

Optionally, the first period includes at least one period value, and the at least one period value corresponds to at least one of the following:

at least one period value configured via radio resource control RRC;

at least one period value indicated by side link control information SCI; and at least one period value indicated by downlink control information DCI.

Optionally, the method in this embodiment of the present invention further includes:

sending configuration information of a resource selection window in the partial sensing mechanism; where the configuration information of the resource selection window includes at least one of the following:

a length configuration parameter of the resource selection window; and a position configuration parameter of the resource selection window.

Specifically, the length configuration parameter of the resource selection window includes one of the following:

a length of the resource selection window;

a minimum value of the length of the resource selection window;

a length range of the resource selection window; and a length ratio of the resource selection window.

Further, the length ratio of the resource selection window is:a ratio of a length of a resource selection window to be selected by the terminal to a length of a resource selection window selectable by the terminal.

Specifically, in a case that the configuration information includes the position configuration parameter of the resource selection window, a start time of the resource selection window includes at least one of the following:

the start time of the resource selection window being at least from a time point corresponding to a fourteenth time interval after triggering of resource selection;

the start time of the resource selection window being greater than or equal to a time point corresponding to a fifteenth time interval after triggering of resource selection; and the start time of the resource selection window being from n+T1; where n is a time point of triggering resource selection, and T1 is a protocol-defined minimum time of resource selection.

Specifically, in a case that the configuration information includes the position configuration parameter of the resource selection window, an end time of the resource selection window includes at least one of the following:

the end time of the resource selection window falling within a range smaller than a delay budget PDB of a data packet; and the end time of the resource selection window falling within a range of a first preset time after triggering of resource selection.

It should be noted that all the descriptions about the network-side device in the foregoing embodiment are applicable to the embodiment of the resource selection method, with the same technical effects achieved. Details are not repeated herein.

Figure 12:
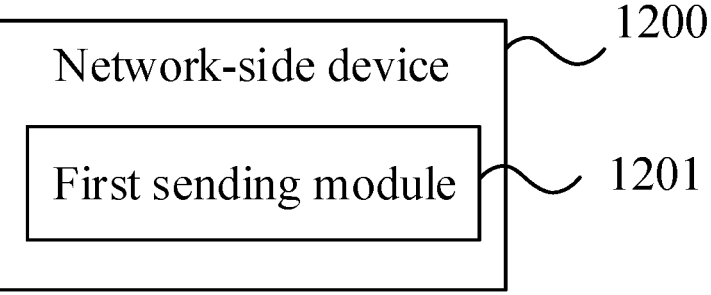
FIG. 12 is a schematic modular diagram of a network-side device according to an embodiment of the present invention.

As shown in FIG. 12, an embodiment of the present invention further provides a network-side device 1200, including:

a first sending module 1201, configured to send configuration information of a sensing window in a partial sensing mechanism to a terminal.

Further, the configuration information of the sensing window includes at least one of the following:

a length configuration parameter of the sensing window; and a position configuration parameter of the sensing window.

Optionally, the length configuration parameter of the sensing window includes at least one of the following:

a length of the sensing window;

a minimum value of the length of the sensing window; and a length range of the sensing window.

Optionally, the position configuration parameter of the sensing window includes at least one of a start time of the sensing window, an end time of the sensing window, and a position of the sensing window.

The start time of the sensing window includes one of the following:

the start time of the sensing window being a time point corresponding to a first time interval before the terminal triggers resource selection or re-selection; and the start time of the sensing window being a time point corresponding to a second time interval after the terminal triggers resource selection or re-selection.

The end time of the sensing window includes:

the end time of the sensing window being a time point corresponding to a third time interval before the terminal triggers resource selection or re-selection. The position of the sensing window includes one of the following:

the position of the sensing window being determined based on a position of a resource selection window; and the position of the sensing window being determined based on a resource that has been selected by the terminal.

Further, if the position of the sensing window is determined based on the position of the resource selection window, the start time of the sensing window includes at least one of the following:

the start time of the sensing window being a time point corresponding to a fourth time interval before the resource selection window;

the start time of the sensing window being a start time of the resource selection window;

the start time of the sensing window being a start time of a selectable resource selection window;

the start time of the sensing window being a time point corresponding to a later one of a time point corresponding to a fifth time interval before the resource selection window and the start time of the selectable resource selection window; and the start time of the sensing window being a time point corresponding to a later one of a time point corresponding to a sixth time interval before the resource selection window and the start time of the resource selection window.

Further, if the position of the sensing window is determined based on the position of the resource selection window, the end time of the sensing window includes at least one of the following:

the end time of the sensing window being an end time of the resource selection window;

the end time of the sensing window being a time point corresponding to a seventh time interval before the end time of the resource selection window; and the end time of the sensing window being a time point corresponding to an eighth time interval before a transmission resource selected by the terminal.

Further, in a case that the start time of the sensing window is the time point corresponding to the second time interval after the terminal triggers resource selection or re-selection, the end time of the sensing window is:

a time point corresponding to a ninth time interval before a transmission resource selected by the terminal; or a time point corresponding to a tenth time interval before an end time of the resource selection window.

Further, the position of the sensing window being determined by the resource that has been selected by the terminal includes at least one of the following:

the start time of the sensing window being a time point corresponding to an eleventh time interval before the resource that has been selected; and the position of the sensing window being between a time point corresponding to a twelfth time interval before the resource that has been selected and a time point corresponding to a thirteenth time interval before the resource that has been selected.

Further, in a case that the start time of the sensing window is the time point corresponding to the eleventh time interval before the resource that has been selected, the end time of the sensing window is:

a time point corresponding to a fourteenth time interval before a transmission resource selected by the terminal; or a time point corresponding to a fifteenth time interval before an end time of the resource selection window.

Optionally, a manner of obtaining the length configuration parameter of the sensing window includes:

the length of the sensing window being determined based on a length of a resource selection window.

Optionally, a manner of obtaining the position configuration parameter of the sensing window includes:

the sensing window being determined based on a position of a resource selection window and a higher-layer parameter indication; and the sensing window being determined based on a first period.

Specifically, the first period includes at least one of the following:

a period configured for the terminal;

a period configured for a resource pool; and a period of data to be transmitted by the terminal.

Specifically, position configuration information of a sensing window indicated by a higher-layer parameter is k bits, and a value of a bit length of k is related to at least one of the following:

a period value of data to be transmitted by the terminal;

a period value configured in a first resource pool; and whether periodic reservation is enabled for the first resource pool; where k is an integer.

Optionally, in a case that periodic reservation is enabled for the first resource pool, the value of the bit length of k is determined by the period value of the data to be transmitted by the terminal, a configured period value, or the period value configured in the first resource pool.

Specifically, k=ceil(slot count corresponding to T_sensingwindow divided by a value of the first period); where ceil(*) represents a round-up function, and T_sensingwindow is a length of a first sensing window.

Specifically, in a case that there are at least two period values in a resource pool in which the terminal is located, and each period value corresponds to one piece of k-bit information:

a plurality of k-bit indications are configured by the higher layer; or one piece of indication information is configured by the higher layer, where a size of the indication information is a maximum value of a plurality of bit lengths of k.

Optionally, the first period includes at least one period value, and the at least one period value corresponds to at least one of the following:

at least one period value configured via radio resource control RRC;

at least one period value indicated by side link control information SCI; and at least one period value indicated by downlink control information DCI.

Optionally, the network-side device in this embodiment of the present invention further includes:

a second sending module, configured to send configuration information of a resource selection window in the partial sensing mechanism; where the configuration information of the resource selection window includes at least one of the following:

a length configuration parameter of the resource selection window; and a position configuration parameter of the resource selection window.

Specifically, the length configuration parameter of the resource selection window includes one of the following:

a length of the resource selection window;

a minimum value of the length of the resource selection window;

a length range of the resource selection window; and a length ratio of the resource selection window.

Further, the length ratio of the resource selection window is:a ratio of a length of a resource selection window to be selected by the terminal to a length of a resource selection window selectable by the terminal.

Specifically, in a case that the configuration information includes the position configuration parameter of the resource selection window, a start time of the resource selection window includes at least one of the following:

the start time of the resource selection window being at least from a time point corresponding to a fourteenth time interval after triggering of resource selection;

the start time of the resource selection window being greater than or equal to a time point corresponding to a fifteenth time interval after triggering of resource selection; and the start time of the resource selection window being from n+T1; where n is a time point of triggering resource selection, and T1 is a protocol-defined minimum time of resource selection.

Specifically, in a case that the configuration information includes the position configuration parameter of the resource selection window, an end time of the resource selection window includes at least one of the following:

the end time of the resource selection window falling within a range smaller than a delay budget PDB of a data packet; and the end time of the resource selection window falling within a range of a first preset time after triggering of resource selection.

An embodiment of the present invention further provides a network-side device, including a memory, a processor, and a computer program stored in the memory and capable of running on the processor. When the computer program is executed by the processor, the processes of the foregoing resource selection method embodiment applied to the network-side device can be implemented, with the same technical effects achieved. To avoid repetition, details are not described herein again.

An embodiment of the present invention further provides a computer-readable storage medium, where a computer program is stored in the computer-readable storage medium. When the computer program is executed by a processor, the processes of the foregoing resource selection method embodiment applied to the network-side device are implemented, with the same technical effects achieved. To avoid repetition, details are not described herein again. The computer-readable storage medium is, for example, a read-only memory (ROM), a random access memory (RAM), a magnetic disk, or an optical disc.

Figure 13:
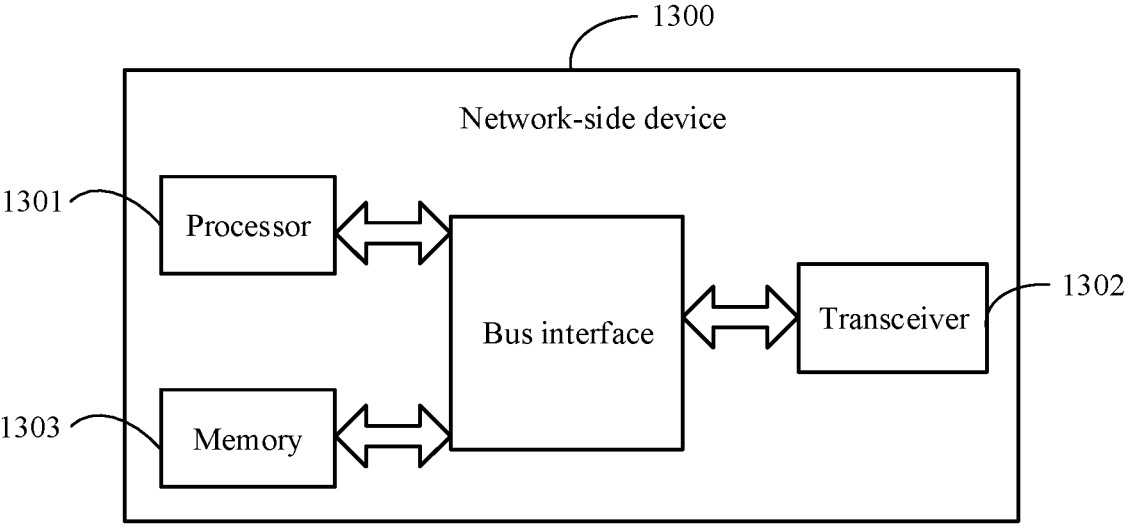
FIG. 13 is a structural block diagram of a network-side device according to an embodiment of the present invention.

FIG. 13 is a structural diagram of a network-side device according to an embodiment of the present invention, and the network-side device is capable of implementing details of the resource selection method described above, with the same effects achieved. As shown in FIG. 13, the network-side device 1300 includes a processor 1301, a transceiver 1302, a memory 1303, and a bus interface.

The processor 1301 is configured to read a program in the memory 1303 to perform the following process:

sending configuration information of a sensing window in a partial sensing mechanism to a terminal by using the transceiver 1302.

In FIG. 13, a bus architecture may include any quantity of interconnected buses and bridges, specifically for interconnecting various circuits of one or more processors represented by the processor 1301 and a memory represented by the memory 1303. The bus architecture may further interconnect various other circuits such as a peripheral device, a voltage regulator, and a power management circuit. These are all well known in the art, and therefore are not further described in this specification. The bus interface provides interfaces. The transceiver 1302 may be a plurality of components, that is, the transceiver 1302 includes a transmitter and a receiver, and provides a unit for communicating with various other apparatuses on a transmission medium.

Further, the configuration information of the sensing window includes at least one of the following:

a length configuration parameter of the sensing window; and a position configuration parameter of the sensing window.

Optionally, the length configuration parameter of the sensing window includes at least one of the following:

a length of the sensing window;

a minimum value of the length of the sensing window; and a length range of the sensing window.

Optionally, the position configuration parameter of the sensing window includes at least one of a start time of the sensing window, an end time of the sensing window, and a position of the sensing window.

The start time of the sensing window includes one of the following:

the start time of the sensing window being a time point corresponding to a first time interval before the terminal triggers resource selection or re-selection; and the start time of the sensing window being a time point corresponding to a second time interval after the terminal triggers resource selection or re-selection.

The end time of the sensing window includes:

the end time of the sensing window being a time point corresponding to a third time interval before the terminal triggers resource selection or re-selection.

The position of the sensing window includes one of the following:

the position of the sensing window being determined based on a position of a resource selection window; and the position of the sensing window being determined based on a resource that has been selected by the terminal.

Further, if the position of the sensing window is determined based on the position of the resource selection window, the start time of the sensing window includes at least one of the following:

the start time of the sensing window being a time point corresponding to a fourth time interval before the resource selection window;

the start time of the sensing window being a start time of the resource selection window;

the start time of the sensing window being a start time of a selectable resource selection window;

the start time of the sensing window being a time point corresponding to a later one of a time point corresponding to a fifth time interval before the resource selection window and the start time of the selectable resource selection window; and the start time of the sensing window being a time point corresponding to a later one of a time point corresponding to a sixth time interval before the resource selection window and the start time of the resource selection window.

Further, if the position of the sensing window is determined based on the position of the resource selection window, the end time of the sensing window includes at least one of the following:

the end time of the sensing window being an end time of the resource selection window;

the end time of the sensing window being a time point corresponding to a seventh time interval before the end time of the resource selection window; and the end time of the sensing window being a time point corresponding to an eighth time interval before a transmission resource selected by the terminal.

Further, in a case that the start time of the sensing window is the time point corresponding to the second time interval after the terminal triggers resource selection or re-selection, the end time of the sensing window is:

a time point corresponding to a ninth time interval before a transmission resource selected by the terminal; or a time point corresponding to a tenth time interval before an end time of the resource selection window.

Further, the position of the sensing window being determined by the resource that has been selected by the terminal includes at least one of the following:

the start time of the sensing window being a time point corresponding to an eleventh time interval before the resource that has been selected; and the position of the sensing window being between a time point corresponding to a twelfth time interval before the resource that has been selected and a time point corresponding to a thirteenth time interval before the resource that has been selected.

Further, in a case that the start time of the sensing window is the time point corresponding to the eleventh time interval before the resource that has been selected, the end time of the sensing window is:

a time point corresponding to a fourteenth time interval before a transmission resource selected by the terminal; or a time point corresponding to a fifteenth time interval before an end time of the resource selection window.

Optionally, a manner of obtaining the length configuration parameter of the sensing window includes:

the length of the sensing window being determined based on a length of a resource selection window.

Optionally, a manner of obtaining the position configuration parameter of the sensing window includes:

the sensing window being determined based on a position of a resource selection window and a higher-layer parameter indication; and the sensing window being determined based on a first period.

Specifically, the first period includes at least one of the following:

a period configured for the terminal;

a period configured for a resource pool; and a period of data to be transmitted by the terminal.

Specifically, position configuration information of a sensing window indicated by a higher-layer parameter is k bits, and a value of a bit length of k is related to at least one of the following:

a period value of data to be transmitted by the terminal;

a period value configured in a first resource pool; and whether periodic reservation is enabled for the first resource pool; where k is an integer.

Optionally, in a case that periodic reservation is enabled for the first resource pool, the value of the bit length of k is determined by the period value of the data to be transmitted by the terminal, a configured period value, or the period value configured in the first resource pool.

Specifically, k=ceil(slot count corresponding to T_sensingwindow divided by a value of the first period); where ceil(*) represents a round-up function, and T_sensingwindow is a length of a first sensing window.

Specifically, in a case that there are at least two period values in a resource pool in which the terminal is located, and each period value corresponds to one piece of k-bit information:

a plurality of k-bit indications are configured by the higher layer; or one piece of indication information is configured by the higher layer, where a size of the indication information is a maximum value of a plurality of bit lengths of k.

Optionally, the first period includes at least one period value, and the at least one period value corresponds to at least one of the following:

at least one period value configured via radio resource control RRC;

at least one period value indicated by side link control information SCI; and at least one period value indicated by downlink control information DCI.

Optionally, the processor 1301 is configured to read a program in the memory 1303 to further perform the following process:

sending configuration information of a resource selection window in the partial sensing mechanism to the terminal by using the transceiver 1302; where the configuration information of the resource selection window includes at least one of the following:

a length configuration parameter of the resource selection window; and a position configuration parameter of the resource selection window.

Specifically, the length configuration parameter of the resource selection window includes one of the following:

a length of the resource selection window;

a minimum value of the length of the resource selection window;

a length range of the resource selection window; and a length ratio of the resource selection window.

Further, the length ratio of the resource selection window is:a ratio of a length of a resource selection window to be selected by the terminal to a length of a resource selection window selectable by the terminal.

Specifically, in a case that the configuration information includes the position configuration parameter of the resource selection window, a start time of the resource selection window includes at least one of the following:

the start time of the resource selection window being at least from a time point corresponding to a fourteenth time interval after triggering of resource selection;

the start time of the resource selection window being greater than or equal to a time point corresponding to a fifteenth time interval after triggering of resource selection; and the start time of the resource selection window being from n+T1; where n is a time point of triggering resource selection, and T1 is a protocol-defined minimum time of resource selection.

Specifically, in a case that the configuration information includes the position configuration parameter of the resource selection window, an end time of the resource selection window includes at least one of the following:

the end time of the resource selection window falling within a range smaller than a delay budget PDB of a data packet; and the end time of the resource selection window falling within a range of a first preset time after triggering of resource selection.

The network-side device may be a base station (Base Transceiver Station, BTS) in global system for mobile communications (GSM) or code division multiple access (CDMA), or may be a base station (NodeB, NB) in wideband code division multiple access (WCDMA), or may be an evolved base station (Evolved Node B, eNB or eNodeB) in LTE, or a relay station or access point, or a base station in the future 5G network, which is limited herein.

It should be noted that, it should be understood that division of modules of the network device and the terminal is merely logical function division. The modules may be all or partially integrated in a physical entity or may be physically separate in an actual implementation. In addition, the modules may be all implemented in a form of software invoked by a processing component, or may be all implemented in a form of hardware; or a part of modules may be implemented in a form of software invoked by a processing component, and another part of modules may be implemented in a form of hardware. For example, a determining module may be a processing component that is separately disposed, or may be integrated in a chip of the apparatus for implementation. In addition, the determining module may be stored in the memory of the apparatus in a form of program code, and is invoked by a processing component of the apparatus to perform a function of the determining module. Implementation of other modules is similar to this. In addition, the modules may be all or partially integrated, or may be implemented independently. Herein, the processing component may be an integrated circuit, and has a signal processing capability. In an implementation process, steps in the foregoing method or the foregoing modules can be implemented by using a hardware integrated logical circuit in the processor component, or by using instructions in a form of software.

For example, the foregoing modules, units, subunits, or submodules may be configured as one or more integrated circuits that implement the foregoing methods, such as one or more application-specific integrated circuits (ASIC), one or more microprocessors (digital signal processor, DSP), or one or more field programmable gate arrays (FPGA). For another example, when one of the foregoing modules is implemented by invoking program code by the processing element, the processing element may be a general-purpose processor, such as a central processing unit (CPU), or another processor that can invoke the program code. For still another example, these modules may be integrated together and implemented in a system-on-a-chip (SOC) form.

In the specification and claims of this application, the terms such as "first" and "second" are intended to distinguish between similar objects but do not necessarily indicate a specific order or sequence. It should be understood that the data used in this way is interchangeable in appropriate circumstances so that the embodiments of this application described herein can be implemented in other orders than the order illustrated or described herein. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, system, product, or device. In addition, the use of "and/or" in the specification and claims represents presence of at least one of the connected objects. For example, A and/or B and/or C represents the following seven cases: A alone, B alone, C alone, both A and B, both B and C, both A and C, and all of A, B, and C. Similarly, the term "at least one of A and B" used in the specification and claims should be understood as "only A exists, only B exists, or both A and B exist".

The foregoing descriptions are preferred implementations of the present invention. It should be noted that a person of ordinary skill in the art may make several improvements or refinements without departing from the principle of the present invention and the improvements or refinements shall fall within the protection scope of the present invention.

What is claimed is:

1. A resource selection method, performed by a terminal and comprising:
obtaining configuration information of a sensing window in a partial sensing mechanism;
performing monitoring in the sensing window indicated by the configuration information to obtain a monitoring result; and
obtaining a selectable resource set based on the monitoring result;
wherein the configuration information of the sensing window comprises a position of the sensing window being determined based on a position of a resource selection window;
wherein a start time of the sensing window comprises:
the start time of the sensing window being a time point corresponding to a first time interval before the resource selection window;
wherein the method for obtaining the position of the sensing window further comprises:
the position of the sensing window being determined based on the position of the resource selection window and at least one period value configured via radio resource control (RRC).

2. The resource selection method according to claim 1, wherein the configuration information of the sensing window further comprises:
a length configuration parameter of the sensing window.

3. The resource selection method according to claim 2, wherein the length configuration parameter of the sensing window comprises at least one of the following:
a length of the sensing window;
a minimum value of the length of the sensing window; or
a length range of the sensing window.

4. The resource selection method according to claim 2, wherein the length configuration parameter of the sensing window is at least one of the following:
a protocol-predefined parameter;
a parameter configured via RRC;
a parameter indicated by a medium access control control element (MAC CE);
a parameter indicated by downlink control information (DCI);
a parameter indicated by sidelink control information (SCI);
a parameter that is determined based on the start time and/or an end time of a resource selection window; or
a length configuration parameter of the sensing window that is determined based on a length of the resource selection window.

5. The resource selection method according to claim 1, before the obtaining a selectable resource set based on the monitoring result, further comprising:
obtaining configuration information of a resource selection window in the partial sensing mechanism; wherein the configuration information of the resource selection window comprises at least one of the following:

a length configuration parameter of the resource selection window; or a position configuration parameter of the resource selection window.

6. The resource selection method according to claim 5, wherein the length configuration parameter of the resource selection window comprises one of the following:

a length of the resource selection window;

a minimum value of the length of the resource selection window;

a length range of the resource selection window; or a length ratio of the resource selection window.

7. The resource selection method according to claim 5, wherein in a case that the configuration information comprises the position configuration parameter of the resource selection window, the start time of the resource selection window comprises at least one of the following:

the start time of the resource selection window being at least from a time point corresponding to a second time interval after triggering of resource selection;

the start time of the resource selection window being greater than or equal to a time point corresponding to a third time interval after triggering of resource selection; or the start time of the resource selection window being from n+T1; wherein n is a time point of triggering resource selection, and T1 is a protocol-defined minimum time of resource selection; or an end time of the resource selection window comprises at least one of the following:

the end time of the resource selection window falling within a range smaller than a delay budget PDB of a data packet; or the end time of the resource selection window falling within a range of a first preset time after triggering of resource selection.

8. The resource selection method according to claim 1, wherein after the obtaining a selectable resource set based on the monitoring result, the method further comprises:

in the partial sensing mechanism, if a first condition is satisfied, performing, by the terminal, at least one of the following:

triggering a resource selection window;

in a case that periodic reservation is enabled, transmitting, by the terminal on a selectable resource of a next period, a to-be-retransmitted current transport block corresponding to a first data packet; or discarding the first data packet.

9. The resource selection method according to claim 8, wherein the first condition comprises one of the following:

the terminal has received a non-acknowledgement of the first data packet in the resource selection window, and the terminal has no reserved resources or the terminal has no dynamically reserved resources;

the terminal has received discontinuous transmission DTX of the first data packet in the resource selection window, and the terminal has no reserved resources or the terminal has no dynamically reserved resources; or the terminal has received no acknowledgement information for the first data packet in the resource selection window, and the terminal has no reserved resources or the terminal has no dynamically reserved resources.

10. The resource selection method according to claim 1, wherein the obtaining configuration information of the sensing window in the partial sensing mechanism comprises:

obtaining configuration information of at least one sensing window from a protocol prescription.

11. A terminal, comprising a memory, a processor, and a computer program stored in the memory and capable of running on the processor, wherein when the computer program is executed by the processor, the steps of a resource selection method are implemented, comprising:

obtaining configuration information of a sensing window in a partial sensing mechanism;

performing monitoring in the sensing window indicated by the configuration information to obtain a monitoring result; and obtaining a selectable resource set based on the monitoring result;

wherein the configuration information of the sensing window comprises a position of the sensing window being determined based on a position of a resource selection window;

wherein a start time of the sensing window comprises:

the start time of the sensing window being a time point corresponding to a first time interval before the resource selection window;

wherein the method for obtaining the position of the sensing window further comprises:

the position of the sensing window being determined based on the position of the resource selection window and at least one period value configured via radio resource control (RRC).

12. The terminal according to claim 11, wherein the obtaining configuration information of the sensing window in the partial sensing mechanism comprises:

obtaining configuration information of at least one sensing window from a protocol prescription.

13. The terminal according to claim 11, wherein the configuration information of the sensing window further comprises:

a length configuration parameter of the sensing window.

14. The terminal according to claim 13, wherein the length configuration parameter of the sensing window comprises at least one of the following:

a length of the sensing window;

a minimum value of the length of the sensing window; or a length range of the sensing window.

15. The terminal according to claim 13, wherein the length configuration parameter of the sensing window is at least one of the following:

a protocol-predefined parameter;

a parameter configured via RRC;

a parameter indicated by a medium access control control element (MAC CE);

a parameter indicated by downlink control information (DCI);

a parameter indicated by sidelink control information (SCI);

a parameter that is determined based on the start time and/or an end time of a resource selection window; or a length configuration parameter of the sensing window that is determined based on a length of the resource selection window.

16. The terminal according to claim 11, before the obtaining a selectable resource set based on the monitoring result, further comprising:

obtaining configuration information of a resource selection window in the partial sensing mechanism; wherein the configuration information of the resource selection window comprises at least one of the following:

a length configuration parameter of the resource selection window; or a position configuration parameter of the resource selection window.

17. The terminal according to claim 16 wherein the length configuration parameter of the resource selection window comprises one of the following:

a length of the resource selection window;

a minimum value of the length of the resource selection window;

a length range of the resource selection window; or a length ratio of the resource selection window.

18. The terminal according to claim 16, wherein in a case that the configuration information comprises the position configuration parameter of the resource selection window, the start time of the resource selection window comprises at least one of the following:

the start time of the resource selection window being at least from a time point corresponding to a second time interval after triggering of resource selection;

the start time of the resource selection window being greater than or equal to a time point corresponding to a third time interval after triggering of resource selection; or the start time of the resource selection window being from n+T1; wherein n is a time point of triggering resource selection, and T1 is a protocol-defined minimum time of resource selection; or an end time of the resource selection window comprises at least one of the following:

the end time of the resource selection window falling within a range smaller than a delay budget PDB of a data packet; or the end time of the resource selection window falling within a range of a first preset time after triggering of resource selection.

19. The terminal according to claim 11, wherein after the obtaining a selectable resource set based on the monitoring result, the method further comprises:

in the partial sensing mechanism, if a first condition is satisfied, performing, by the terminal, at least one of the following:

triggering a resource selection window;

in a case that periodic reservation is enabled, transmitting, by the terminal on a selectable resource of a next period, a to-be-retransmitted current transport block corresponding to a first data packet; or discarding the first data packet.

20. A network-side device, comprising a memory, a processor, and a computer program stored in the memory and capable of running on the processor, wherein when the computer program is executed by the processor, the steps of a resource selection method are implemented, comprising:

sending configuration information of a sensing window in a partial sensing mechanism to a terminal;

wherein the configuration information of the sensing window is used for determining the sensing window;

wherein the configuration information of the sensing window comprises a position of the sensing window being determined based on a position of a resource selection window;

wherein a start time of the sensing window comprises:

the start time of the sensing window being a time point corresponding to a first time interval before the resource selection window;

wherein the method for obtaining the position of the sensing window further comprises:

the position of the sensing window being determined based on the position of the resource selection window and at least one period value configured via radio resource control (RRC).

*   *   *   *   *